US 7,754,826 B1

(12) United States Patent
Smith, Jr. et al.

(10) Patent No.: US 7,754,826 B1
(45) Date of Patent: Jul. 13, 2010

(54) COPOLYMERS FROM LACTIDE

(75) Inventors: Dennis W. Smith, Jr., Seneca, SC (US); Dahlia Haynes, Central, SC (US); Nilmini Abayasinghe, Spartanburg, SC (US)

(73) Assignee: Clemson University, Clemson, SC (US)

( * ) Notice: Subject to any disclaimer, the term of this patent is extended or adjusted under 35 U.S.C. 154(b) by 423 days.

(21) Appl. No.: 11/599,993

(22) Filed: Nov. 15, 2006

Related U.S. Application Data

(60) Provisional application No. 60/736,712, filed on Nov. 15, 2005.

(51) Int. Cl.
C08G 63/08 (2006.01)
(52) U.S. Cl. .................. 525/450; 528/354; 528/361
(58) Field of Classification Search ................ 525/417, 525/418, 419, 420, 450, 451; 521/134, 138
See application file for complete search history.

(56) References Cited

U.S. PATENT DOCUMENTS

| 4,938,763 | A | * | 7/1990 | Dunn et al. ............. | 604/891.1 |
| 5,466,444 | A | * | 11/1995 | Jurgens .................. | 424/78.08 |
| 5,633,342 | A | | 5/1997 | Verser et al. | |
| 5,725,491 | A | | 3/1998 | Tipton et al. | |
| 5,756,651 | A | | 5/1998 | Chen et al. | |
| 5,817,728 | A | | 10/1998 | Higuchi et al. | |
| 5,908,918 | A | | 6/1999 | Chen et al. | |
| 5,952,433 | A | | 9/1999 | Wang et al. | |
| 6,093,792 | A | | 7/2000 | Gross et al. | |
| 6,124,269 | A | | 9/2000 | Phan et al. | |
| 6,172,128 | B1 | | 1/2001 | Lau et al. | |
| 6,410,140 | B1 | | 6/2002 | Land et al. | |
| 6,436,426 | B1 | | 8/2002 | Liao et al. | |
| 7,071,288 | B2 | | 7/2006 | Smith et al. | |

OTHER PUBLICATIONS

Abayasinghe, N. et al., J. Biomater. Sci. Polymer Edn, 2004, 15(5), 595-606.*
Noda, I. et al., Macromol. Biosci., 2004, 4, 269-275.*
Hiki et al., Polymer 41 (2000) 7369-7379.*
Smith et al., Proceedings from the ACS Annual Meeting, Aug. 22-24, 2004 [online] [retrieved on Feb. 12, 2009]. Retrieved from the Internet<http://pubs.acs.org/cgi-bin/preprints/display?div=poly&meet=228&page=6000.html>.*
Smith et al., Proceedings from the ACS Annual Meeting, Mar. 23-27, 2003 [online] [retrieved on Feb. 12, 2009]. Retrieved from the Internet<http://pubs.acs.org/cgi-bin/preprints/display?div=poly&meet=225&page=1000.html>.*
Smith et al., NTC Project: M04-CL07, National Textiles Center Annual Report, published Sep. 30, 2004. [online] [retrieved on Feb. 12, 2009]. Retrieved from the Internet:<http://www.ntcresearch.org/pdf-rpts/AnRp04/M04-CL07-A4.pdf>.*
Data sheet for VICRYL® (polyglactin 910) sutures, ETHICON, Inc., 1996 [online], [retrieved on Feb. 12, 2009]. Retrieved from the Internet<URL: http://www.ethicon.com/content/backgrounders/www.ethicon.com/www.ethicon.com/vicryl_epi.pdf>.*

Maximo Deysine, Hernia Infections—Pathophysiology Diagnosis Treatment Prevention, 2004, p. 242-243, Marcel Dekker, Inc.*
George Odian, Principles of Polymerization, 2004, p. 105, 4th Ed., Wiley & Sons.*
Data sheet for Baker Hughes's UNILIN® product line [online] [retrieved on Feb. 12, 2009]. Retrieved from the Internet:<URL: http://www.bakerhughesdirect.com/cgi/bpc/resources/ExternalFileHandler.jsp?bookmarkable=Yes&path=private/BPC/public/polymers/linear_primary_alcohols.html&channelId=-4206910>.*
Abe, H.; Doi, Y.; Hori, Y.; Hagiwara, T.; Polymer, 1997, vol. 39, No. 1, p. 59-67.*
Schmidt, S.C.; Hillmyer, M.A.; Journal of Polymer Science: Part B: Polymer Physics, 2001, vol. 39, p. 300-313.*
Duda, A.; Biela, T.; Libiszowski, J.; Penczek, S.; Dubois, P.; Mecerreyes, D.; Jerome, R.; Polymer Degradation and Stability, 59, 1998, p. 215-222.*
Sodergard, A.; Stolt, M.; Progress in Polymer Science, 27, 2002, p. 1123-1163.*
Article—*Novel Polyester Hydroxy Ether Terpolymers from Lactide and Bisphenol-A Derivatives*—Authors, Nilmini Abayasinghe and Dennis W. Smith, Jr.—Polymer Preprints, vol. 43, 2002, pp. 615-616.
Article—*Terpolymers from Lactide and Bisphenol A Derivatives: Introducing Renewable Resource Monomers into Commodity Thermoplastics*—Authors, Nilmini K. Abayasinghe and Dennis W. Smith, Jr.—Macromolecules, vol. 36, 2003, pp. 9681-9683.
Article—*Synthesis and Characterization of [L]-Lactide-Ethylene Oxide Multiblock Copolymers*—Authors, Xianhai Chen, Stephen P. McCarhey, and Richard A. Gross—Macromolecules, vol. 30, 1997, pp. 4295-4301.
Agostini, et al., "Synthesis and Characterization of Poly-β-Hydroxybutyrate. I. Synthesis of Crystalline DL-Poly-β-Hydroxybutyrate from DL- β-Butyrolactone", Journal of Polymer Science: pat A-1, vol. 9, pp. 2775-2787 (1971).
Agostini, et al., Synthesis and Characterization of Poly-β-Hydroxybutyrate. II. Synthesis of D-Poly- β-Hydroxybutyrate and the Mechanism of Ring-Opening Polymerization of β-Butyrolactone, Journal of Polymer Science: pat A-1, vol. 9, pp. 2789-2799 (1971).
Melchiors, et al., "Synthesis of highly isotactic poly[®-3-hydroxybutyrate] by ring-opening polymerization of (R,R,R)-4,8,12-trimethyl-1,5,9-trioxacyclodedeca-2,6,10-trione", Macromol. Rapid Commun. 15, pp. 497-506 (1994).
Shelton, et al., Synthesis and Characterization of Poly (β-Hydroxybutyrate) Polymer Letters, vol. 9, pp. 173-178 (1971).
Shelton et al., Synthesis and Characterization of Poly-β-Hydroxybutyrate. II. Synthesis of D-Poly- β-hydroxybutyrate and the mechanism of Ring-Opening Polymerization of—β-Butyrolactone, Journal of Polymer Science Part A-1, vol. 9, pp. 2789-2799 (1971).

\* cited by examiner

*Primary Examiner*—James Seidleck
*Assistant Examiner*—Robert Jones, Jr.
(74) *Attorney, Agent, or Firm*—Dority & Manning, P.A.

(57) ABSTRACT

Disclosed is a process for producing lactide-based copolymers and copolymers produced by the process. The copolymers are formed by the copolymerization of a lactide monomer with a secondary material. In one embodiment, the secondary material can be derived from renewable resources, providing a product copolymer completely derived from renewable resources. The disclosed materials may display improved hydrolytic and thermal characteristics as compared to previously known lactide-based materials. Exemplary secondary materials that can be copolymerized with lactide can include polyhydroxy alkanoates, long chain primary alcohols, and depsipeptides.

11 Claims, 20 Drawing Sheets

COPOLYMERS FROM LACTIDE

CROSS REFERENCE TO RELATED APPLICATION

The present application claims filing benefit of U.S. provisional patent application Ser. No. 60/736,712 filed on Nov. 15, 2005, which is hereby incorporated by reference in its entirety.

FEDERALLY SPONSORED RESEARCH AND DEVELOPMENT

The United States Government may have rights in this subject matter pursuant to National Science Foundation ERC Award No. EEC-9731680.

BACKGROUND

The production of polymers utilizing renewable resources has been a field of increasing interest for many years. One particular area of interest concerns the production of polyesters that may be formed from polymerization of lactic acid-based monomers. Specifically, ring-opening polymerization of lactide has shown promise in production of polymeric materials. Lactic acid-based materials are often of particular interest as the raw materials can be derived from renewable resources (e.g., corn, plant starches, and canes).

Various approaches have been attempted to obtain lactide-based polymeric materials having desired product characteristics. For example, copolymerization with other materials and preparation of substituted polylactides have been examined extensively. For instance, Chen, et al. ('Synthesis and Characterization of [L]-Lactide-Ethylene Oxide Multiblock Copolymers', *Macromolecules,* 1997, 30(15), 4295-4301) have examined direct copolymerization of lactide with oxirane using a wide range of tin and aluminum based organometallic catalysts.

Unfortunately, the copolymers obtained by such methods and from such materials tend to have very limited applications. Limited applicability has been primarily due to the problematical processing characteristics as well as due to the ultimate product characteristics. For instance, materials obtained to date have low melt temperature ($T_m$) and higher brittleness than would be desirable in many applications.

Another problem encountered with lactic acid-based polymeric materials has been a lack of hydrolytic stability and difficulty in recycling the materials. For example, the hydrolytic stability of the polymers is often such that they degrade too quickly during use, rendering them unsuitable for many applications. In addition, lactide homopolymers are only aerobically recyclable, and thus difficult to remove from the waste stream.

What is needed in the art are ecologically friendly polymeric materials capable of displaying improved characteristics, including materials that may be produced from raw materials derived from renewable resources.

SUMMARY

Disclosed are polymers formed according to a polymerization scheme including the ring opening polymerization of lactide. The polymers include, in addition to the lactide residue, a second residue that can be, for example, a polyhydroxyalkanoate residue, a primary alcohol residue of a primary alcohol having at least about 10 carbon atoms in the chain, or a depsipeptide residue. The starting material of a second residue of a lactide-based copolymer as described herein can include homopolymers and copolymers.

The polymers can be linear polyester thermoplastic polymers or thermosets, depending upon the nature of the starting materials. Moreover, a lactide-based polymer as described herein is not limited to a bicomponent polymer, and can include additional components.

The lactide-based polymers can exhibit excellent properties. For instance, a polymer can exhibit a glass transition temperature ($T_g$) greater than about 50° C. in one embodiment, or higher in another embodiment, for instance greater than about 55° C.

A variety of polymeric materials can incorporate a polymer as disclosed herein. For instance, a polymeric material incorporating a lactide-based polymer can be a thermoplastic or a thermoset. Polymeric materials can be formed into fibers, e.g., monofilament fibers, films, coatings, or the like.

A polymeric material including a lactide-based polymer can include additional polymers. For instance, a polymeric material as disclosed herein can function as a compatibilizer for a polymer blend or as a nucleating agent in a polymer formation process.

A polymeric material including a lactide-based copolymer can have beneficial characteristics. For example, a polymeric material can be completely derived from renewable resources. A polymeric material as described herein can be biodegradable. In one embodiment, a polymeric material including a lactide-based copolymer as described herein can be biocompatible.

BRIEF DESCRIPTION OF THE FIGURES

A full and enabling disclosure, including the best mode, to one of ordinary skill in the art, is set forth more particularly in the remainder of the specification, including reference to the accompanying figures, in which.

DETAILED DESCRIPTION

Figure 1:
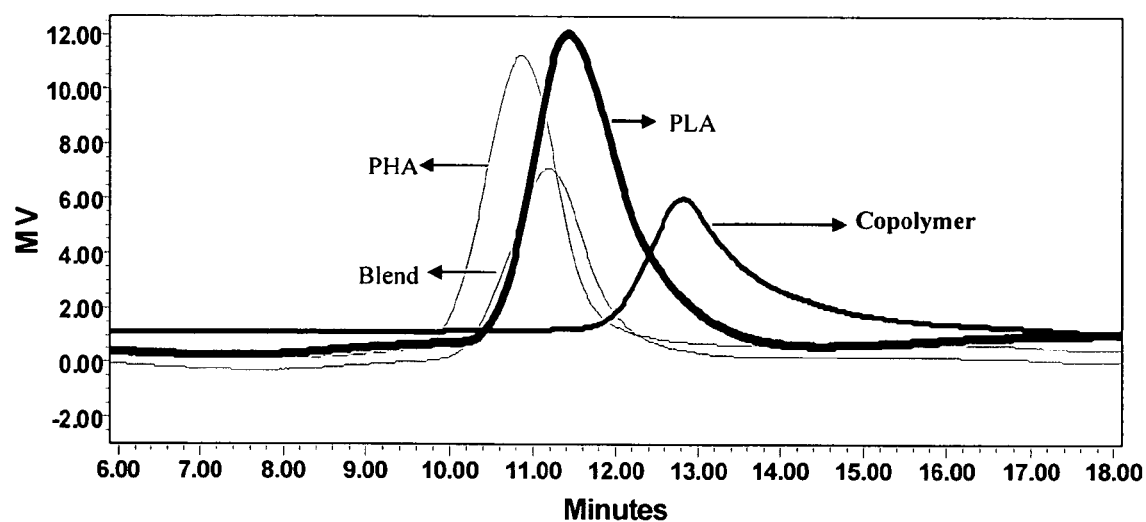
FIG. 1 illustrates the gel permeation chromatography (GPC) curves for polyhydroxyalkanoate (PHA), polylactide (PLA), a PHA-co-PLA copolymer, and a PHA/PLA blend.

Reference will now be made in detail to various embodiments of the disclosed subject matter, one or more examples of which are set forth below. Each embodiment is provided by way of explanation of the subject matter, not limitation thereof.

In general, the disclosed subject matter is directed to novel lactide-based polymers and polymeric materials incorporating the polymers as well as processes for producing the disclosed materials. The polymers can exhibit good thermal and crystalline characteristics and can, in one particular embodiment, be completely derived from renewable resources. Production and use of the disclosed materials can reduce problems associated with previously known petroleum-based polymers, including environmental problems faced while obtaining the raw petroleum materials and during production of the materials, as well as problems associated with the eventual disposal of the petroleum-based materials.

The disclosed polymers can exhibit improved product characteristics as compared to previously known lactic acid-based polymers. For example, the disclosed materials can exhibit improved physical characteristics such as melt temperatures, strength characteristics, and hydrolytic characteristics so as to be suitable for use in a wide variety of commercial applications. For example, polymers described herein may be utilized in the formation of packaging materials, fibers, and coatings as well as in biomedical and commodity applications, where better processability and rate of degradation can be quite important. In one embodiment, disclosed materials can be utilized as compatibilizers in PLA/polyolefin blends or as nucleating agents for formation of poly-L-lactide or other polyesters.

In general, a process of the present subject matter can include a ring-opening polymerization reaction of lactide in the presence of one or more additional materials to produce a novel copolymer. Through the disclosed processes, exemplary lactide-based copolymers can be produced with a crystallinity greater than about 40% and a tensile modulus greater than about 20 MPa.

Lactic acid occurs in nature via fermentation of carbohydrates such as glucose, sucrose, and lactose. Lactic acid is produced commercially by fermentation of whey, cornstarch, potatoes, molasses, and the like. The lactide monomer is formed by the depolymerization of the lactic acid oligomer. In the past, production of lactide was a slow, expensive process, but recent advances in the art have enabled the production of high purity lactide at reasonable costs.

The chiral carbon atom in the lactic acid structure results in the three stereoisomers of lactide, shown below:

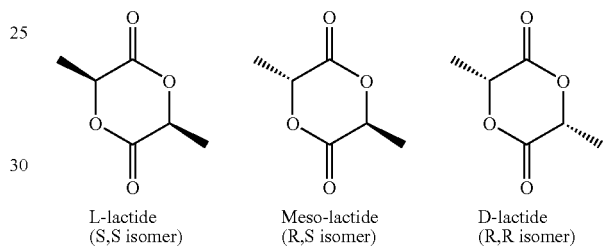

L-lactide (S,S isomer)   Meso-lactide (R,S isomer)   D-lactide (R,R isomer)

Disclosed processes can utilize either racemic mixtures or pure enantiomers of lactide. In general, a racemate of L- and D-lactide may be preferred due to economic realities, but this is not a requirement of any disclosed process.

The disclosed processes include the ring-opening copolymerization of lactide with a second material to provide a copolymer exhibiting beneficial characteristics. In one embodiment, the second material can be derived from renewable resources. In another embodiment, a polymeric material including a copolymer thus formed can be completely derived from renewable resources. Copolymers disclosed herein can exhibit characteristics similar to or even better than those of polymers derived from nonrenewable resources.

In one embodiment, a polyhydroxyalkanoate (PHA) homopolymer or copolymer can be copolymerized with lactide. PHAs are a class of biopolymers that are produced in nature by bacterial fermentation of sugars or lipids. Various microorganisms including *Ralstonia eutropha*, *Alcalgenes latus*, and *Pseudomonas* sp. have been reported to produce PHAs by the condensation or modification of acetyl-CoAs.

There are many different polymers within the general PHA family that can be copolymerized with lactide to produce a polyester, e.g., a linear polyester. Accordingly, product polyesters can have a wide range of properties. For example, as PHA polymers can be thermoplastic and elastomeric, and can describe melting temperatures anywhere between about 40° C. and 180° C. A copolymer product can likewise describe a wide range of characteristics. PHAs have attracted a great deal of attention not only due to their anaerobic biodegradable nature, but also due to the high degree of crystallinity and well-defined melt temperatures that are attainable for certain members of the class.

The general structure of a PHA homopolymer that can be copolymerized with lactide monomer according to the present disclosure can be described as:

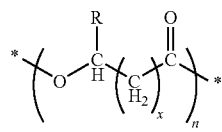

Wherein:
R is an alkyl group
and
x is $\geq 1$

One of the most common PHAs is poly(beta-hydroxybutyrate) in which R is a methyl group and x=1, the structure of which is shown below:

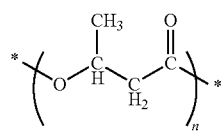

The present disclosure is not limited to PHA homopolymers, however, and in other embodiments, lactide can be copolymerized with PHA copolymers to form the disclosed materials. For example, there are a wide variety of PHA copolymers commercially available under the trade name NODAX™ from the Procter & Gamble Company of Cincinnati, Ohio that can be copolymerized with lactide according to the presently disclosed process to form novel lactide-based copolymers exhibiting beneficial characteristics.

The polymerization process can include the ring-opening polymerization of lactide in the presence of a PHA. When considering a PHA homopolymer, the reaction scheme may be illustrated as follows:

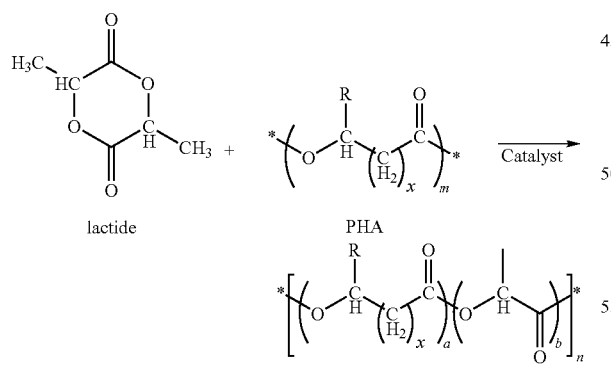

wherein:
R is an alkyl group and
x is $\geq 1$
$a \geq 1$;
$b \geq 2$

In the case of a PHA copolymer, an idealized reaction scheme can be:

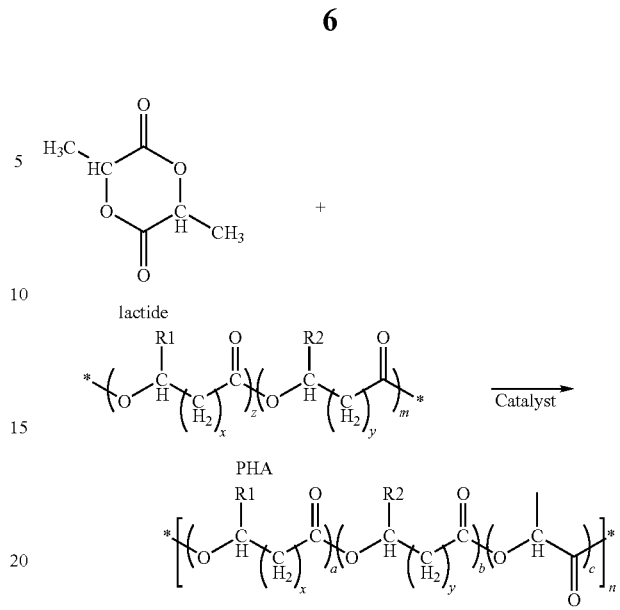

wherein:
R1 and R2 are different alkyl groups a, b, c, m, x, y, and z all 1

In another embodiment, lactide can be copolymerized with a long chain branched or straight chain primary alcohol. For instance, lactide can be copolymerized with a primary alcohol having a chain length greater than about 10 carbons. In one embodiment, lactide can be copolymerized with a primary alcohol having a chain length greater than about 20 carbons. Long chain primary alcohols are generally known to those of skill in the art and commercially available. For example, exemplary long chain primary alcohols commercially available and suitable for use in formation of the disclosed copolymers are available from the Baker Petrolite Company of Sugar Land, Tex. under the trade name of Unilin®.

An idealized reaction scheme according to an embodiment including copolymerization of a lactide with an straight chain primary alcohol can be illustrated as:

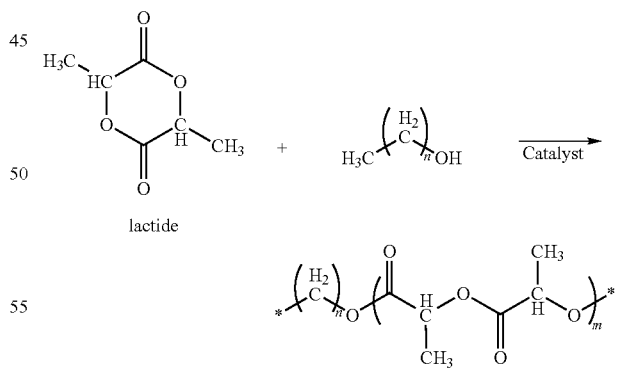

wherein:
$n \geq 10$
$m \geq 1$

In one embodiment, the disclosed polymerization reaction between a long chain primary alcohol and a lactide monomer can form a highly crystalline oligoethylene-end-capped polyester. The disclosed oligoethylene-end-capped polyesters (oEPE) can display good biodegradable properties, as well unique crystallization kinetics. For instance, an oEPE as described herein can be beneficially utilized as a nucleation agent in a melt or solution polymer formation process and can exhibit improved crystallization characteristics as compared to previously known nucleating agents.

In another embodiment, lactide can be copolymerized with a depsipeptide. Depsipeptides can be natural or synthetic. They include sequences of amino acid residues and hydroxy carboxylic acid residues (usually α-amino and α-hydroxy acids) that are commonly, but not necessarily, alternating with a regular pattern. Depsipeptides can be cyclic as well, in which case the residues are connected in a ring structure, in which case the polymerization reaction can be a ring opening polymerization for both the lactide monomer and the depsipeptide. A generalized reaction scheme for a cyclic depsipeptide copolymerization reaction can be:

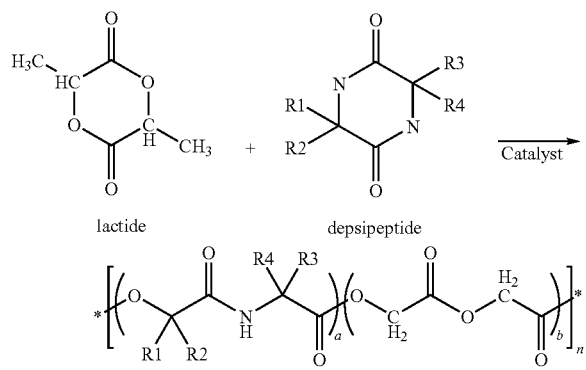

wherein:

R1, R2, R3, R4 are independently hydrogen, alkyl, aryl, ether, ester, halogen, and the like.

The characteristics of the products formed according to the presently disclosed processes may be particularly designed or otherwise enhanced through specific selection of the secondary materials to be polymerized with lactide. For example, in one embodiment, specific functional moieties may be included on a secondary material that can provide one or more desired characteristics to a copolymer. For instance, as is generally known in the art, the surface energy of a polymer is related to the functional groups that gather at its surface. In addition, fluorinated groups are known to produce polymers with low surface energy. As such, the hydrophilic stability of a polymeric product may be improved by utilizing a PHA, a long-chain alcohol, a depsipeptide, or a combination thereof that include fluorine-containing moieties. Similarly, other functional groups, such as aromatic moieties, may be introduced to a PHA, a long-chain alcohol, or a depsipeptide to enhance physical characteristics of a polymer and/or a product.

In general, formation processes can include polymerizing lactide and a secondary material either in a solution polymerization process or from a melt in any desired proportions. For instance, the molar ratios of the reactants can be varied in order to form product polymers within a defined molecular weight range. In one embodiment, the reactants can be provided at a 1:1 ratio, but this is not a requirement, and in other embodiments, more or less lactide can be polymerized with regard to the amount of a secondary material. Moreover, the disclosure is not limited to bicomponent copolymers, and in other embodiments, the copolymers can include multiple monomeric oligomeric and/or polymeric components in random or block copolymer formations.

In one embodiment, copolymers as described herein can be polymerized from solution. Accordingly, a solution of the reactants may be prepared with an organic solvent that has a suitably high boiling point so as to not boil at the reaction temperature. For example, a non-limiting list of possible solvents may include anhydrous toluene, 2-methoxyethyl ether (available as Diglyme, available from Aldrich Chemical), 1-phenoxy-2-propanol (available as Dowanol™ from Aldrich Chemical), and DMAc (N,N'-dimethylacetamide). In one embodiment, a solvent can be an ecologically friendly or "green" solvent. In one particular embodiment, ethyl lactate, a solvent that can be derived from cornstarch, can be used.

Optionally, a solution may be stirred and heated prior to addition of a catalyst. For example, a solution may be heated to a temperature of between about 100° C. and about 200° C. In one particular embodiment, a solution may be heated to a temperature of about 110° C.

A polymerization process can be carried out in the presence of a suitable polymerization catalyst, generally at elevated heat and/or pressure conditions, as is generally known in the art. In general, a catalyst can be any compound or composition that is known to catalyze the polymerization of lactide. Such catalysts are well known, and include alkyl lithium salts and the like, stannous and aluminum catalysts such as stannous octoate, aluminum isopropoxide, and the like, and certain rare earth metal compounds as described in U.S. Pat. No. 5,028,667 to McClain, et al., which is incorporated herein by reference. The particular amount of catalyst used can vary generally depending on the catalytic activity of the catalyst, as well as the temperature of the process and the polymerization rate desired. Typical catalyst concentrations include molar ratios of lactide to catalyst of about 10:1 to about 100,000:1, and in one embodiment from about 2,000:1 to about 10,000:1.

According to one embodiment of the process, a catalyst can be distributed in a starting lactide material. If a solid, a catalyst can have a relatively small particle size. In one embodiment, a catalyst can be added to a monomer solution as a dilute solution in an inert solvent, thereby facilitating handling of the catalyst and its even mixing throughout a monomer solution. In those embodiments in which the catalyst may be a toxic material, the process can also include steps to remove catalyst from the mixture following the polymerization reaction, for instance one or more leaching steps.

Generally, following addition of a catalyst, polymerization of the reactants can automatically proceed over a period of time. For example, in one embodiment, a solution including reactants and a catalyst can be stirred for a period of about 24 hours to achieve polymerization. The amount of time necessary for completion of a polymerization process can vary widely, however. For example, the time required for polymerization following addition of a catalyst to a monomer- or oligomer-containing solution can be anywhere from substantially instantaneous to a period of several days.

In one embodiment, the polymerization process can be carried out at elevated temperature, for example, between about 95° C. and about 200° C., or in one embodiment between about 110° C. and about 170° C., and in another embodiment between about 140° C. and about 160° C.

Depending upon the specific reactants, catalysts, and solvents used in a process, product copolymers displaying particular physical characteristics may be obtained. For example, through variation of the molar ratio of reactants, copolymers with varying molecular weights may be obtained.

Additionally, molecular weight of a product polymer can be controlled through variation of the catalyst and/or solvent used in the process.

The polydispersity of the product polymers ($M_w/M_n$) can be similarly controlled through variation of solvent and/or catalyst, as is generally known in the art. For example, in various embodiments, the polydispersity of polymeric products can be between about 1.5 and about 3.5, for instance, between about 1.8 and about 2.5, and in one embodiment, between about 1.8 and about 2.0.

In one embodiment, lactide-based copolymers can be prepared having a number average molecular weight ($M_n$) between about 3,500 and about 50,000, though in other embodiments, higher or lower molecular weight polymers may be obtained. For instance, in one embodiment a thermoplastic polymeric product can be formed having a number average molecular weight greater than about 50,000. In one embodiment, a copolymer can have a number average molecular weight between about 34,000 and about 38,000.

Lactide-based copolymers may be prepared having higher glass transition temperatures than other previously known lactide-based polymers. For example, a lactide-based thermoplastic polymer as described herein can have a glass transition temperature greater than about 50° C., greater than about 55° C., or greater than about 60° C., in some embodiments. In one embodiment, a lactic-based thermoplastic polymer can have a glass transition temperature ($T_g$) between about 58° C. and about 80° C., or, in certain embodiments, even higher, while thermoset networks of the disclosed polymers can display $T_g$ of up to or even greater than about 200° C.

The disclosed materials can also display excellent mechanical characteristics, for instance, excellent tensile strengths and high crystallinity.

Following the initial polymerization process, a formed polymer can be purified according to any suitable process. For example, in one embodiment, a polymer may be precipitated into n-hexane and dried to a solid. Any other suitable purification process as is generally known in the art may alternatively be utilized, however.

A lactide-based polymer produced according to the disclosed processes may be utilized to form polymeric products such as polymeric films, fibers, or coatings according to processes generally known in the art. For example, in one embodiment, a lactide-based polymer may be solution cast from a solvent to form a polymeric film. If desired, a polymer-containing solution can be cast at very high solids content. For example, a solution can be cast wherein a polymer can be present in solution at amounts of up to about 70% by weight of the solution. In such an embodiment, relatively thick films and coatings can be prepared. In some embodiments, polymeric films having a thickness of about 2 μm may be prepared from the disclosed polymeric materials. For example, polymeric films can be formed having a thickness between about 2 μm and about 200 μm. In one embodiment, even thicker coatings may be prepared. Thick coatings can be formed, for example, as surface coatings in painting or similar coverage applications. For example, in one embodiment, coatings including a disclosed lactide-based polymer can be formed having a thickness of up to or even greater than about 1 mm.

In one embodiment, the disclosed materials can be formed into fibers, for example textile and/or monofilament fibers. For example, polymeric materials including a lactide-based polymer can be melt spun or solution spun to form polymeric fibers. In general, fibers having a diameter of between about 2 μm and about 200 μm can be formed of the disclosed materials. In another embodiment, polymeric fibers or monofilaments can have a diameter of between about 50 μm and about 1 mm. In one embodiment, large polymeric monofilaments can be formed having a diameter of about 1 cm.

Fibers and monofilaments can be utilized in a variety of textile application, such as, for instance, the formation of woven or nonwoven materials. In one embodiment, the disclosed fibers and materials formed therefrom can be used in biological applications, in particular in those embodiments where in the polymeric materials are biocompatible and optionally biodegradable. For example, fibers and/or films can be utilized as sutures or wound coverings in biomedical applications.

Optionally, the disclosed materials can be utilized in conjunction with other, previously known polymerization formation schemes or with other, previously known polymers in forming improved polymeric composite materials. For example, in one embodiment, a disclosed polymer can be utilized as a nucleating agent during polymer formation processes. Nucleating agents in general are well known in the art of polymer formation and can provide nucleation sites for the polymer crystals that can form during the transition of a polymer from the molten state to the solid structure. In one embodiment, a lactide-based nucleating agent can exhibit high solubility in the polymer with which they will be processed.

In another embodiment, a lactide-based polymer can be beneficially utilized as a compatibilizer in a polymer blend. For example, a copolymer can be used as a compatibilizer for a PLA/polyolefin blend. For instance, a polyolefin of a blend could include monomeric components similar to those of a lactide-based copolymer compatibilizer. For example, a PLA-co-PHA copolymer can be utilized as a compatibilizer in a PLA/PHA blend.

Reference now will be made to various embodiments, one or more examples of which are set forth below. Each example is provided by way of explanation of the disclosed subject matter, not as a limitation.

Example 1

L-Lactide (L-LA) was obtained from Ortec Inc. (Easley, S.C.), Poly Med. Inc. (Anderson, S.C.) and Aldrich Chemical Company. Poly(3-hydroxy butyrate-co-3-hydroxyhexanoate (a PHA copolymer sold under the brand NODAX™) was obtained from the Proctor & Gamble Company of Cincinnati, Ohio. Other chemicals and reagents were purchased from Aldrich or Fisher Scientific and used as received unless otherwise stated.

PHA-co-PLLA (also referred to as PHA-co-PLA herein) copolymers were formed from a melt and a solution according to the following idealized reaction scheme:

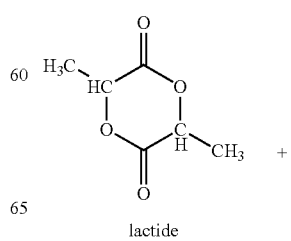

lactide

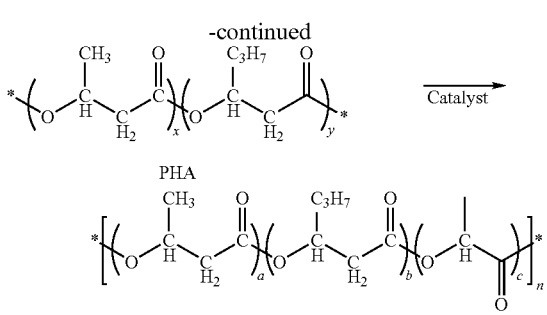

(Melt) Nodax™ (Poly(3-hydroxybutyrate-co-3-Hydroxyhexanoate MW 550,000), (0.2 g), L-LA (0.8 g) and stannous octoate (Sn(Oct)$_2$) (100 μL of 0.01 mol L$^{-1}$ solution in anhydrous toluene) were transferred into a 5 ml ampoule under nitrogen. The ampoule was heated by a handgun to facilitate mixing and sealed under vacuum. The tube was then placed in an oil bath and heated at 130° C. for 24 hours. The crude product was then dissolved in chloroform and precipitated into hexane. The resulting polymer was dried in vacuo. Yield: >90%. FTIR (neat film) (cm$^{-1}$): 756, 870, 978, 1050, 1092, 1131, 1185, 1268, 1304, 1362, 1383, 1453, 1684, 1758, 2894, 2944, 2994; $^1$H NMR (300 MHz, CDCl$_3$) δ (ppm): 5.2 (q, J=6.88 Hz, 1H, β-H, PHA), 5.1 (q, J=7.24 Hz, 3.16H, α-H, LA), 2.5 (dq, J=15.48, 7.24 Hz, 1.59H, α-H, PHA), 1.56 (d, J=6.88 Hz, 15.06, CH$_3$, LA), 1.25 (d, J=6.19, 1.26H, CH$_3$, PHA), 0.88 (t, J=7.24 Hz, 0.16H, —CH$_2$CH$_3$, PHA); $^{13}$C NMR (500 MHz, CDCl$_3$) δ (ppm): 169.71, 169.43, 169.25, 69.10, 67.70, 40.86, 19.86, 18.42, 16.73. See Table 1 for other characterization details.

(Solution) Nodax™ Poly (3-hydroxybutyrate-co-3-Hydroxyhexanoate M$_w$ 550000) (0.2 g), L-LA (0.8 g), toluene (0.5 ml), and Sn(Oct)$_2$ (100 μl of 0.01 mol L$^{-1}$ solution in anhydrous toluene) were transferred into a 5 ml ampoule under nitrogen. The ampoules remained under nitrogen while being heated in an oil bath at 80° C. for 24 hours. The crude product was dissolved in chloroform and precipitated into swirling methanol. The resulting polymer was dried in vacuo. Yield: >90%. FTIR (neat film) (cm$^{-1}$): 756, 870, 978, 1050, 1092, 1131, 1185, 1268, 1304, 1362, 1383, 1453, 1684, 1758, 2894, 2944, 2994; $^1$H NMR (300 MHz, CDCl$_3$) δ (ppm): 5.2 (q, J=6.88 Hz, 1H, β-H, PHA), 5.1 (q, J=7.24 Hz, 4.12H, α-H, LA), 2.5 (dq, J=15.48, 7.24 Hz, 1.11, α-H, PHA), 1.56 (d, J=6.88 Hz, 14.12, CH$_3$, LA), 1.25 (d, J=6.19, 2.99H, CH$_3$, PHA), 0.88 (t, J=7.24 Hz, 0.14H, —CH$_2$CH$_3$, PHA); $^{13}$C NMR (500 MHz, CDCl$_3$) δ (ppm): 169.71, 169.43, 169.25, 69.10, 67.70, 40.86, 19.86, 18.42, 16.73. See Table 1 for other characterization details.

Blend Preparation of 20 wt. % content of PHA/PLLA. Solution blending took place in CHCl$_3$ solvent to obtain a composition having a blend ratio of 20 wt % PHA and 80 wt % PLLA (the same PHA and PLLA as used above). The solution blend was then precipitated into swirling methanol and dried in vacuo.

Films of PHA, PLLA, and PHA-co-PLLA copolymer were formed by first forming solutions having a 10% solvent to polymer ratio. The solutions were then poured onto glass plates and evaporated slowly for 48 hours.

The corresponding values obtained from gel permeation chromotography (GPC) for PHA, PLA, 20 wt % PHA/PLA blend and in situ copolymer obtained from the melt polymerization scheme are summarized in Table 1, below. (Both solution and melt methods showed similar properties with higher molecular weights obtained for the melt, values reported below are those obtained for the melt polymerization copolymer unless otherwise noted.)

| Copolymer | PHA feed wt. % (NMR)$^a$ | M$_n^b$ (×10$^{-3}$) | M$_w$/M$_n^b$ | T$_m^g$ (° C.) | ΔH$_m^g$ (J/g) | T$_c^g$ (° C.) | ΔH$_c^g$ (J/g) | T$_g$ (° C.) | % cryst.$^e$ | T$_d^f$ |
|---|---|---|---|---|---|---|---|---|---|---|
| PLLA | — | 35 | 2.0 | 176 | 41 | 111 | 34 | 61 | 49 | 272 |
| PHA | 100 (100) | 126 | 2.4 | 126, 145 | 3, 31 | 62 | 26 | −1 | — | 283 |
| blend | 20(20) | 46 | 3.7 | 143$^c$, 173$^d$ | 6$^c$, 40$^d$ | 46$^c$, 94$^d$ | 4$^c$, 5$^d$ | −2$^c$, | 48 | 286 |
| PHA/PLA copolymer | 20(19) | 29 | 2.3 | 170 | 34 | 84 | 11 | 56 | 40 | 269 |

$^a$Calculated from $^1$H NMR,
$^b$Determined by GPC,
$^c$Peak associated with PHA,
$^d$Peak associated with PLA,
$^e$Determined from fully crystalline PLA and DSC,
$^f$Determined by TGA,
$^g$Determined by GPC In situ copolymerization resulted in an overall decrease of PHA molecular weight from M$_n$=126,000 to 29,000 as determined by GPC. The copolymer was found to have a relatively narrow molecular weight distribution with a polydispersity in between that found typical for PLA and PHA homopolymers. The corresponding blend showed a higher polydispersity of 3.7 compared to the copolymer. Elution time curves from GPC are compared and shown in FIG. 1.

$^1$H NMR 300 MHz, and proton decoupled $^{13}$C NMR 125 MHz, spectra were obtained using the Bruker AF-300® spectrometer system. Chloroform-d was used as solvent and chemical shifts reported were internally referenced to tetramethylsilane (0 ppm), and CDCl$_3$ (77 ppm) for $^1$H and $^{13}$C nuclei, respectively. Gel permeation chromatography (GPC) data was collected in CHCl$_3$ using a Waters Alliance® refractive index detection at 35° C. and equipped with Polymer Labs PLGel® 5 mm Mixed-C and Mixed E columns. Retention times were calibrated against Polymer Labs Easical® PS-2 polystyrene standards.

Figure 2:
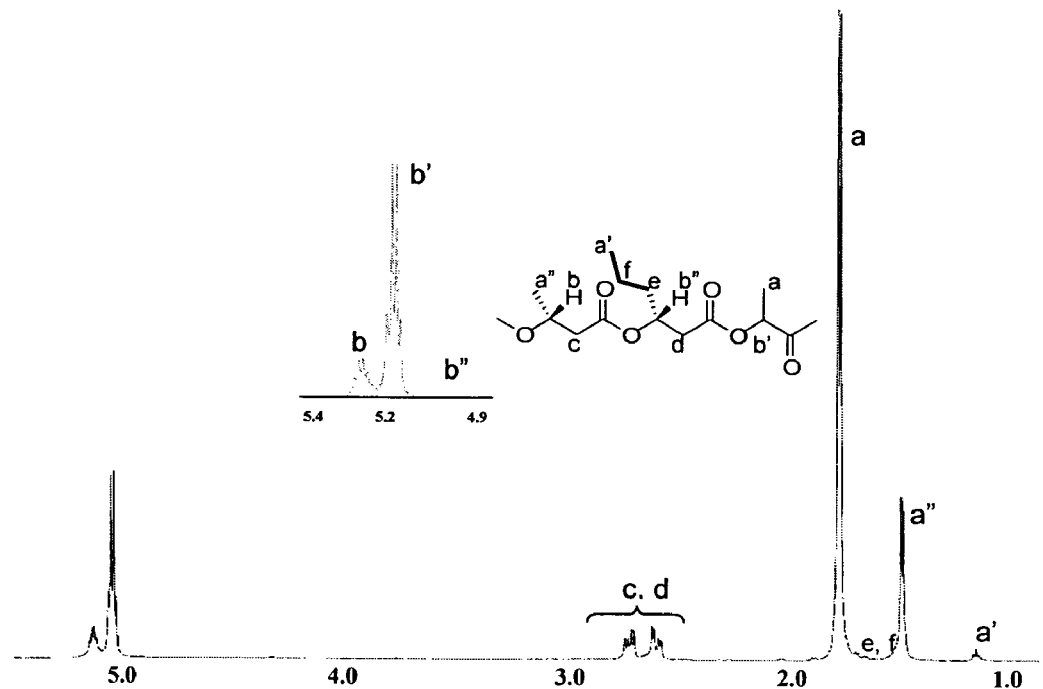
FIG. 2 illustrates the $^1$H NMR spectrum of melt prepared PHA-co-PLA copolymer (FIG. 2A) and $^{13}$C NMR spectrum of solution prepared PHA-co-PLA copolymer (FIG. 2B)
Figure 2:
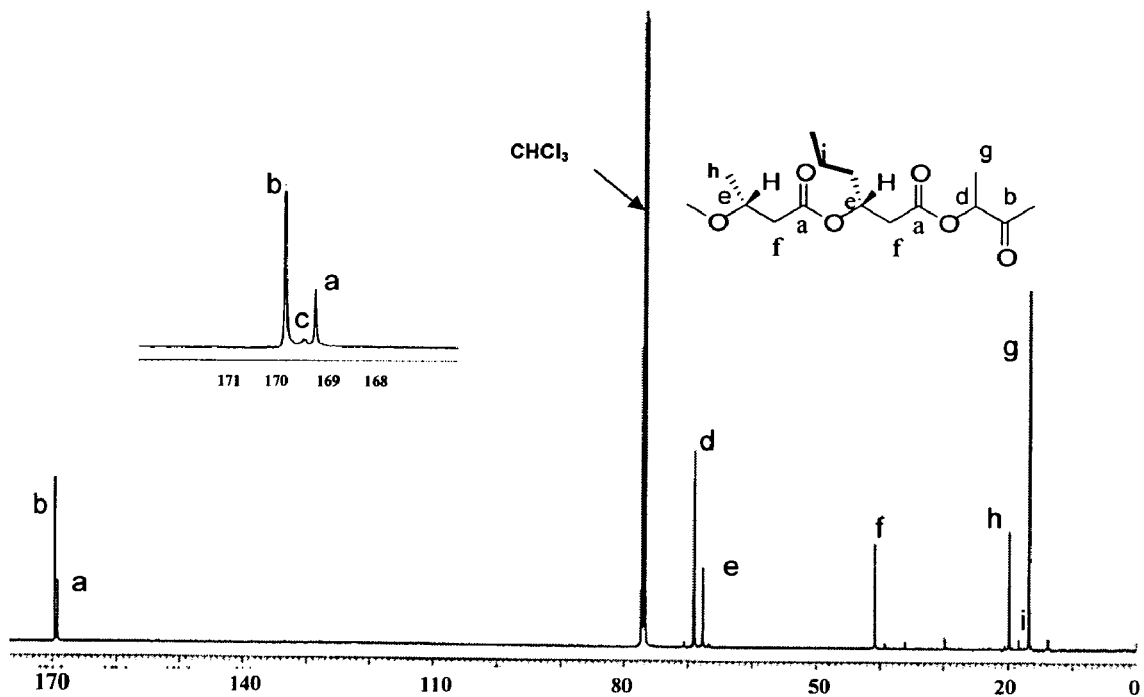

The $^1$H and $^{13}$C NMR spectra for the 20 wt % PHA-co-PLA are shown in FIG. 2A and FIG. 2B. The presence of signals at δ 5.1 and 1.56 ppm in the ¹H NMR spectrum represents the methyl and methylene protons of the lactide linkage, while the presence of signals at δ 5.2 and 1.25 represents the methyl and 13-proton signals of the PHA units. The compositions were determined by the integration ratio of the PLA methyl hydrogens at δ 1.56 with those of the methyl hydrogens of the PHA at δ 1.25 and 0.166. The actual ratio calculated by NMR is consistent with the feed ratio as shown in Table 1. The ¹³C NMR spectrum was analyzed using the expanded signals from the carbonyl region. New ester carbonyl signals that differ from both the parent polymers are found.

Figure 3A:
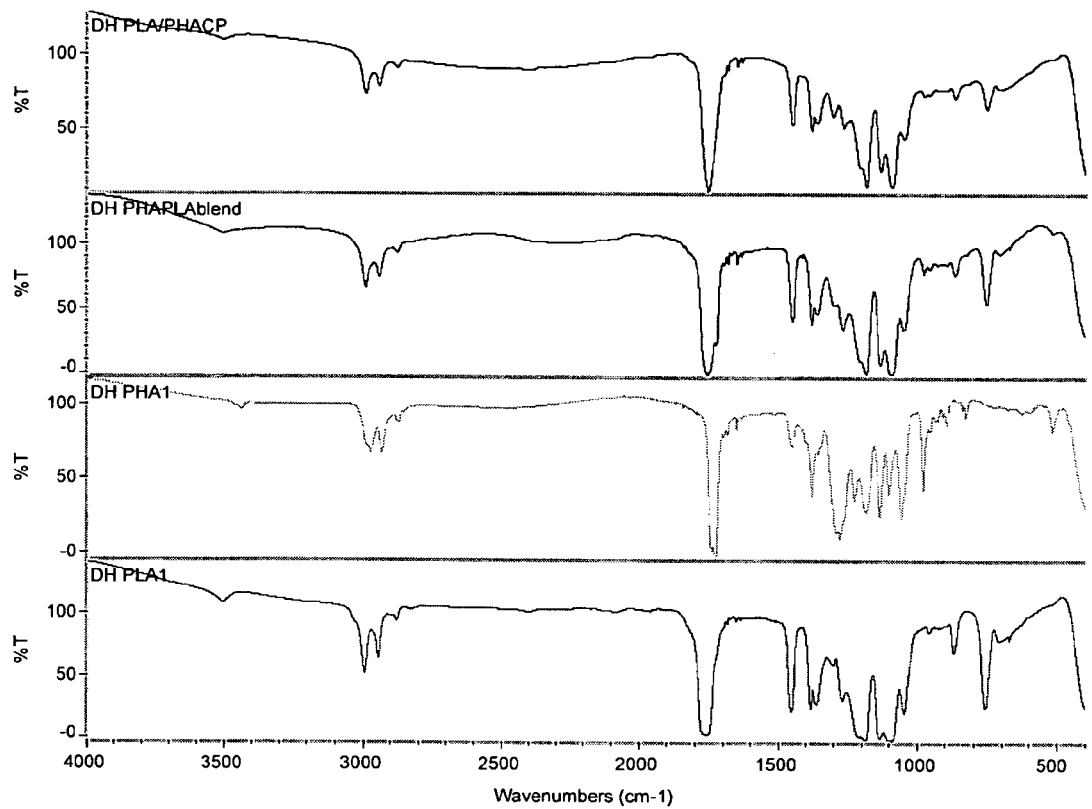
FIG. 3A illustrates Fourier transform Infrared (FTIR) spectra of PLA, PHA, PHA-co-PLA copolymer, and 20 wt % PHA/PLA blend.
Figure 3B:
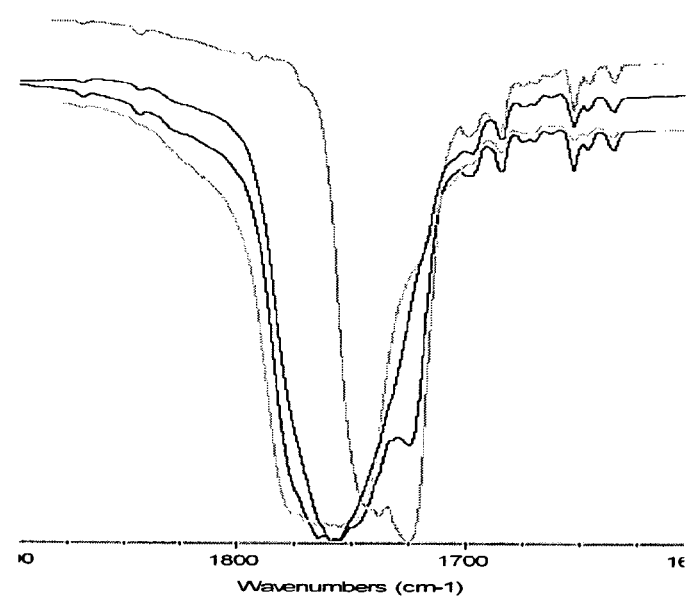
FIG. 3B illustrates the expanded area of the carbonyl region of the spectra of FIG. 3A.

Films of PLLA, PHA, 20 wt % PHA-co-PLA and its corresponding 20 wt % PHA/PLA blend were evaluated by FTIR analysis and the results are shown in FIGS. 3A and 3B. FTIR spectroscopy was performed on thin films using a ThermoNicolet Magna-IR™ 550 FTIR spectrometer equipped with a Nic-Plan microscope, with a resolution of 2 cm⁻¹ using 16 scans.

The characteristic peaks of the C=O band are shown at around 1600 to 1800 cm⁻¹ where PHA has characteristic peaks at 1738 and 1725, and PLA at 1755 cm⁻1. The C=O band occurring at 1758 cm⁻¹ for the copolymer is much sharper than that of the C=O stretching bands of PHA and PLA alone, as can be seen in FIGS. 3A and 3B. The blend of PLA and PHA clearly shows the overlapping of both the C=O respective broad bands, whereas PHA-co-PLA copolymer exhibits a sharper single band. The copolymer fingerprint region occurring at 800 to 1500 cm⁻¹, also shows formation of new peaks that are suggestive of new C—H bonds at the 1375-1450 region and C—O vibrations at 1300-1100 cm⁻¹ that appear in copolymer and which are clearly distinctive from that of PLA and PHA and the blend.

Figure 4:
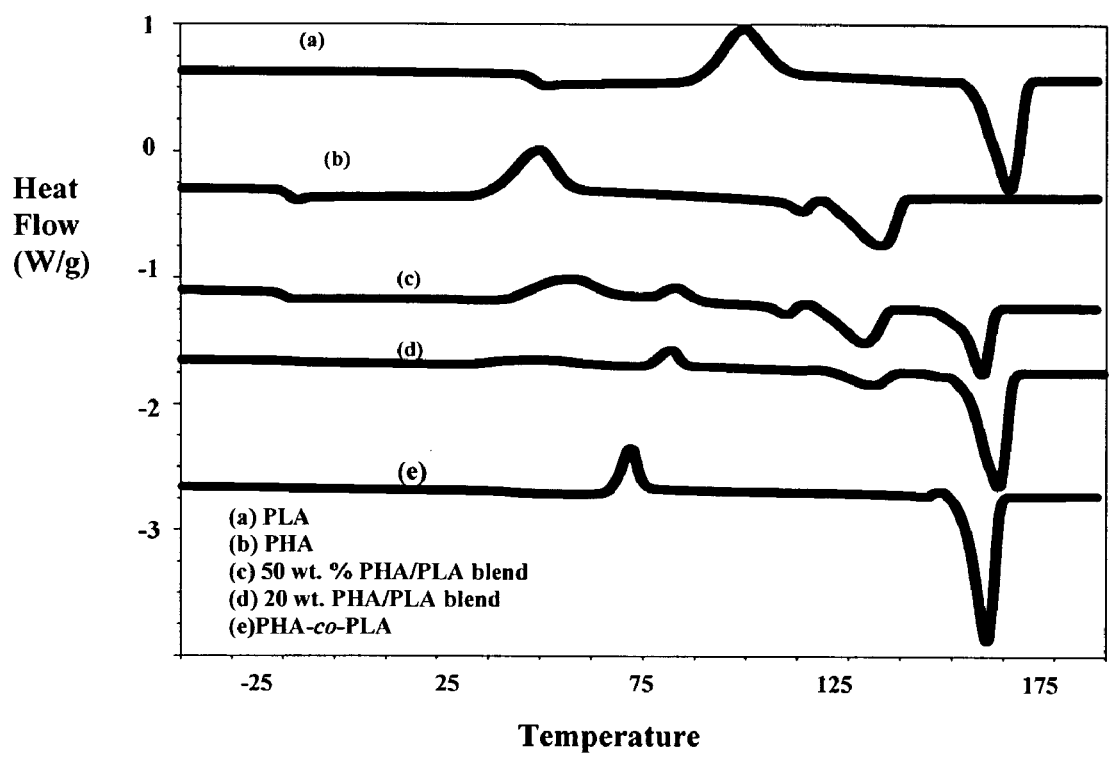
FIG. 4 compares the differential scanning calorimetric (DSC) analysis of the $2^{nd}$ heating curve of melt prepared PLA (a), PHA (b), a 50 wt % PHA/PLA blend (c), a 20 wt % PHA/PLA blend (d) and PHA-co-PLA copolymer from melt (e), FIG. 5 compares the crystalline properties of PHA/PLA blends and PHA-co-PLA copolymers.

Thermal Gravimetrical Analysis (TGA) data were obtained from a Mettler-Toledo 851 TGA/SDTA System at a heating rate of 10° C./min in a nitrogen atmosphere. Differential Scanning Calorimetry (DSC) was obtained from TA instruments Q1000® system with an auto sampler and liquid nitrogen cooling system. Analysis was carried out using TA Instruments Universal Analysis Software. The DSC data for PLA, PHA, 20 wt % PHA-co-polymer, the corresponding 20 wt % blend and a 50 wt. % blend are shown in FIG. 4. The step transition at 61° C. is attributed to the glass transition temperature of PLA with a cold crystallization peak at 110° C. and a melting peak at 176° C. PHA exhibits a glass transition temperature at −1° C., a cold crystallization peak at 62° C. and two melting peaks at 126 and 145° C. The 50 wt. % blend shows the transitions of the 20 wt. % blend more clearly where two separate transitions representative of the PHA and PLA polymers for the melting, crystallization and glass transition temperatures are visible. In comparison to the copolymer the 20 wt. % blend of PHA/PLA shows expected results where the $T_g$ of PHA alone is visible at −2° C., the cold crystallization peak of the blends show a broad transition at 46° C. that overlaps with the $T_g$ for PLA and another $T_c$ corresponding to the PLA transition at 94° C. The melting peaks are also visible at 143 and 173° C. for the main melting transitions of PHA and PLA peaks, respectively. For the copolymer the second heating scan shows one sharp cold crystallization peak at around 84° C., melting peak at 170° C. and a very broad glass transition temperature with center around 56° C. The degree of crystallinity was calculated using the equation:

$$\text{Crystallinity}(\%) = (\Delta H_f / \Delta H_f^\circ) \times 100$$

Where $\Delta H_f$ is the melting enthalpy and $\Delta H_f^\circ = 93$ J/g is the heat of fusion for 100% crystalline PLA. 100% crystalline PLA was used as the reference enthalpy since it is the primary component of the copolymer and blend. The $\Delta H_f$ values were obtained from the melting curves of the second heating scans of the DSC. The degree of crystallinity was reduced by almost 10° C. from the homopolymer of PLA and its corresponding blend. Thermal properties of the copolymers are summarized in Table 1.

Figure 5:
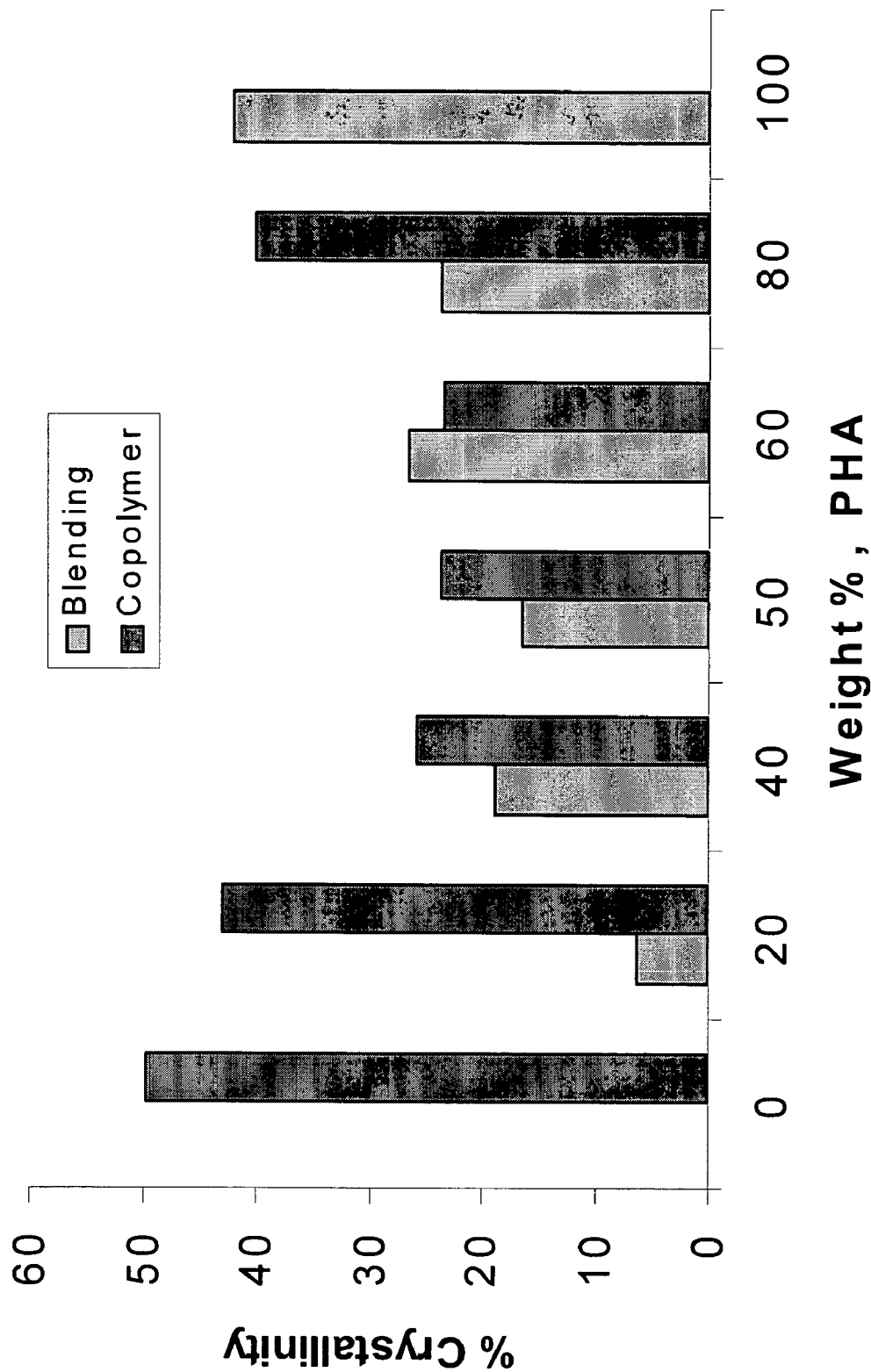

FIG. 5 compares the crystalline characteristics of several copolymers of various PHA weight percentages with those of a PHA/PLLA blend having the same weight percentage of PHA as the copolymer.

Figure 6:
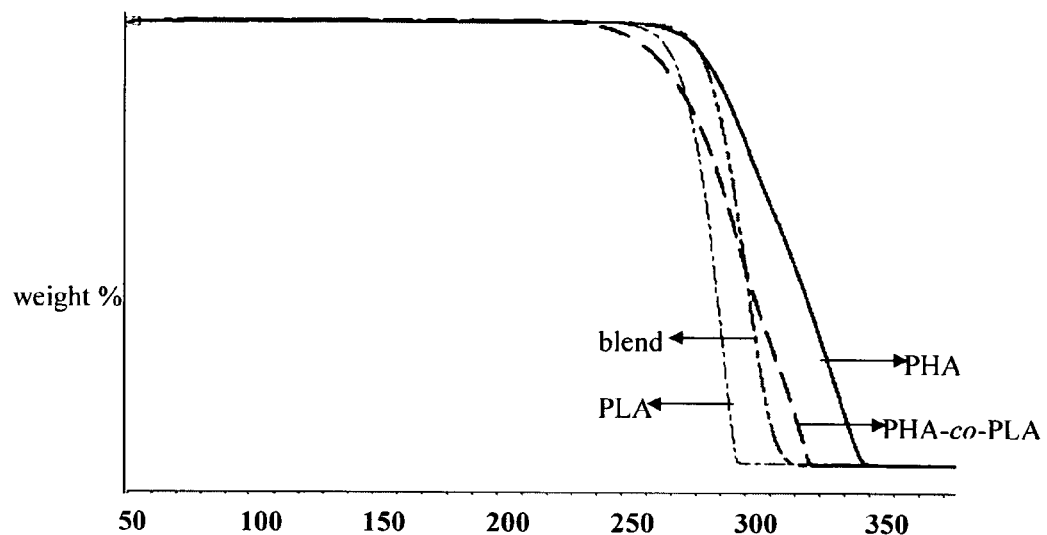
FIG. 6 shows thermal degradation curves for PHA-co-PLA from melt, PLA, PHA, and a PHA/PLA blend.

The glass transition ($T_g$) was obtained from a second heating curve after cooling at 10° C./min. The reported $T_g$ value was taken at the midpoint of the $C_p$ curve. The 20 wt. % copolymer exhibited expected thermal stability, shown in FIG. 6 by Thermal Gravimetric Analysis (TGA). The copolymer gave a $T_d$ value of 269° C. and is similar to PLA while PHA has a $T_d$ of 283° C. The higher molecular weight blend experiences a $T_d$ of 286° C. giving a higher thermal stability than that of the copolymer.

Spherulite morphologies and crystal growth were characterized on a Nikon SMZ-U® microscope utilizing linear polarized light, with an attached Mettler FP82HT® hotstage at which samples was brought to 170° C., remained at isothermal point for 5 minutes, and then allowed to cool down at a rate of 5° C./min. Digital images were captured and analyzed using Image Pro Plus® (4.0) software. Surface topologies were obtained using a scanning electron microscope (Hitachi S-800®) upon which samples was coated with platinum before being mounted.

Figure 7:
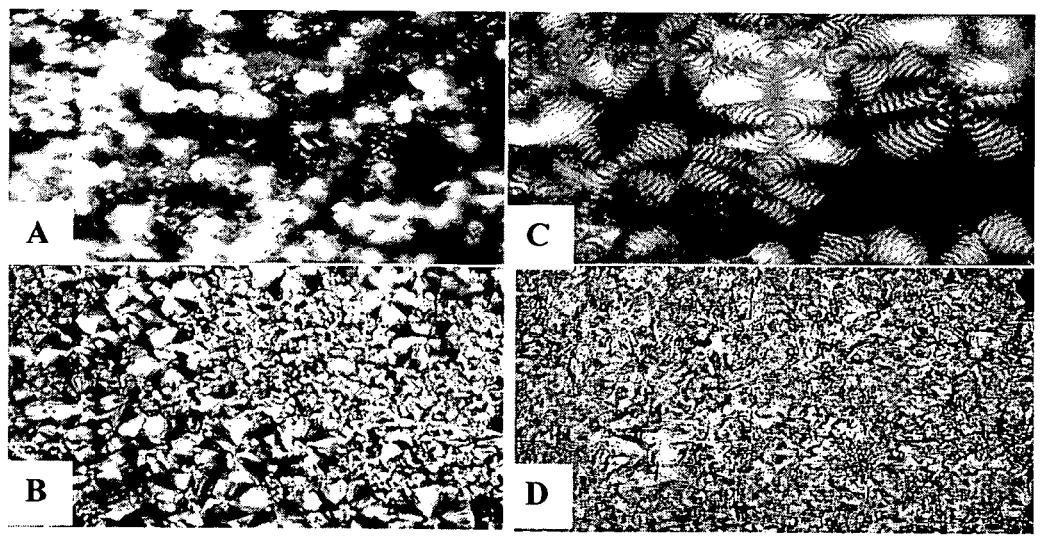
FIG. 7 are polarized optical micrographs showing spherulitic morphology of PLA (FIG. 7A), 20 wt % PHA/PLA blend (FIG. 7B), PHA (FIG. 7C), and 20 wt % PHA-co-PLA copolymer from melt (FIG. 7D), all crystallized at 165° C.

The Optical Polarized Microscopy of PLLA, PHA, a 20 wt. % PHA/PLA blend and 20 wt. % PHA-co-PLA copolymer are shown in FIG. 7. The spherulitic crystal morphology of the copolymer differed significantly from that of PHA and PLLA alone. The spherulites of both PHA and PLLA were evident in the blend suggesting phase immiscibility between the two domains.

Figure 8:
FIG. 8 are scanning electron micrographs (SEM) of cross section surfaces at 1.0 k, 50 μm for PHA-co-PLA solution cast film (FIG. 8A) and electrospun fibers (FIG. 8B)
Figure 8:
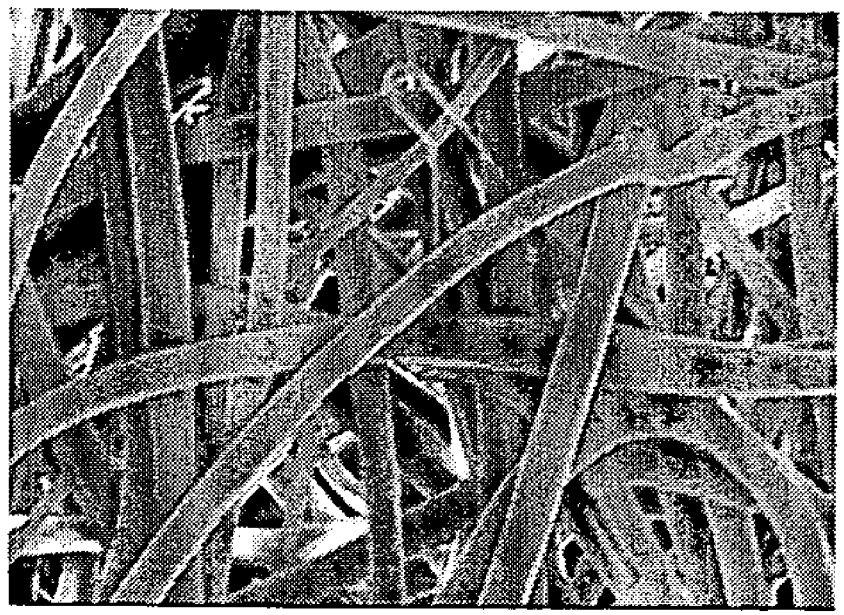

The surface topography of the PHA-co-PLA copolymer film and fiber was observed using SEM analysis using a cryofractured cross section of the film material and electrospun process of the fiber. Cross section surfaces in FIG. 8A exhibit homogenous morphology throughout the entire region and fiber width of the fibers were averaged around 7-8 μm as shown in FIG. 8B.

Viscoelastic measurements were performed using a Rheometric Scientific ARES. Samples were tested using a cone and plate geometry with a diameter of 25 mm where dynamic strain and frequency tests was conducted at a temperature of 165° C.

Figure 9:
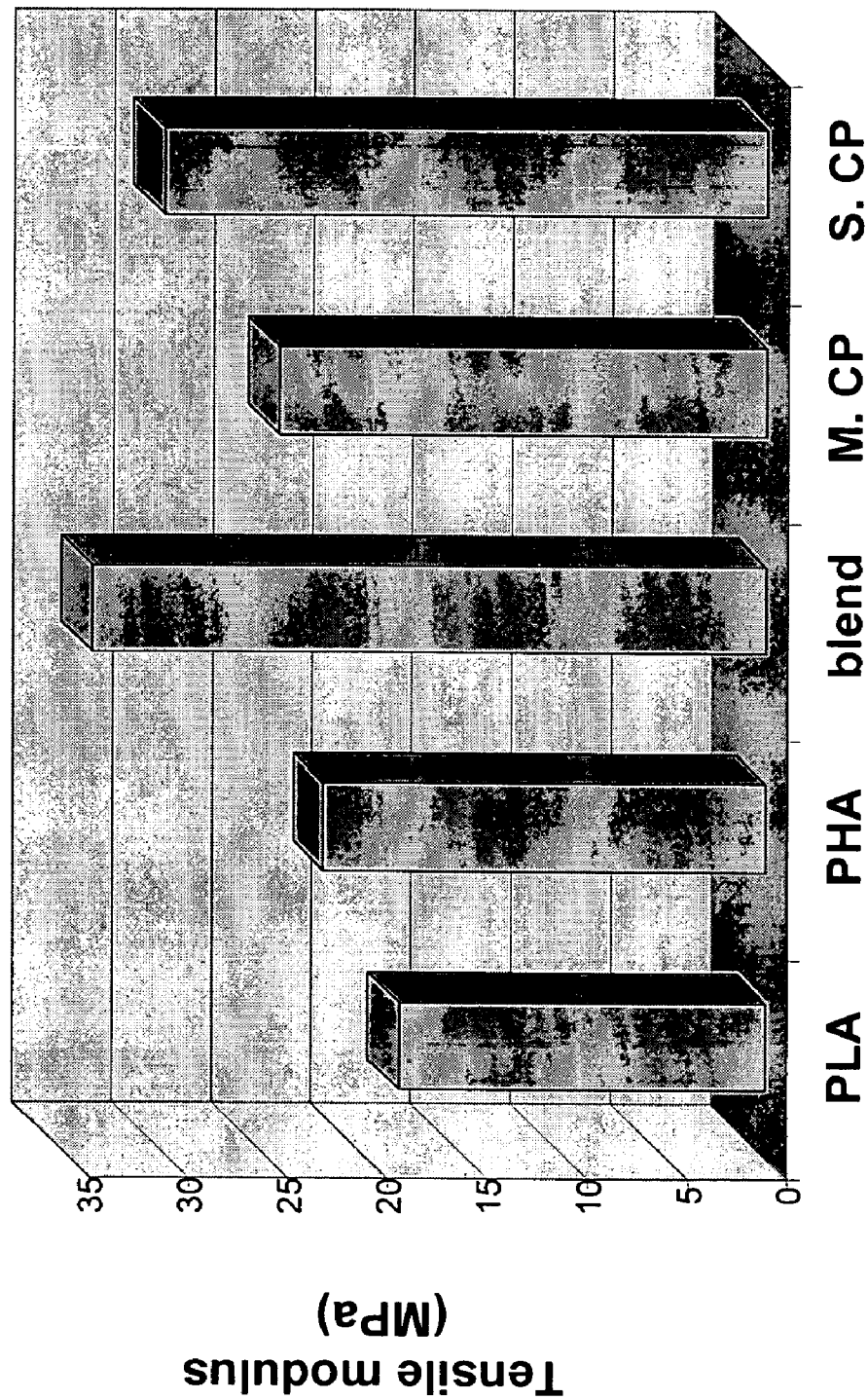
FIG. 9 compares the tensile moduli of films formed from PLA, PHA, a PHA/PLA blend, a PHA-co-PLA melt extruded film, and a PHA-co-PLA solution cast film.
Figure 10:
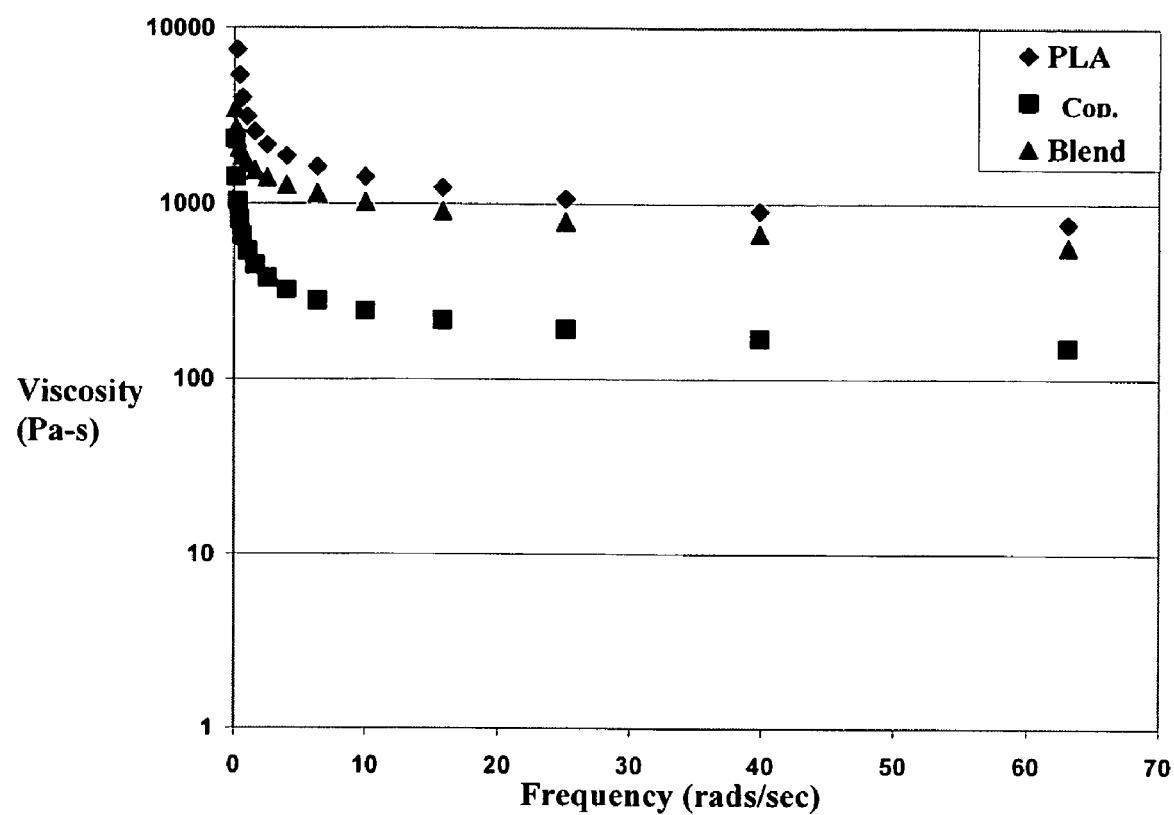
FIG. 10 illustrates the complex viscosity at 165° C. vs. frequency for PLA, a 20 wt % PHA-co-PLA copolymer from melt and a 20 wt % PHA/PLA blend.
Figure 11A:
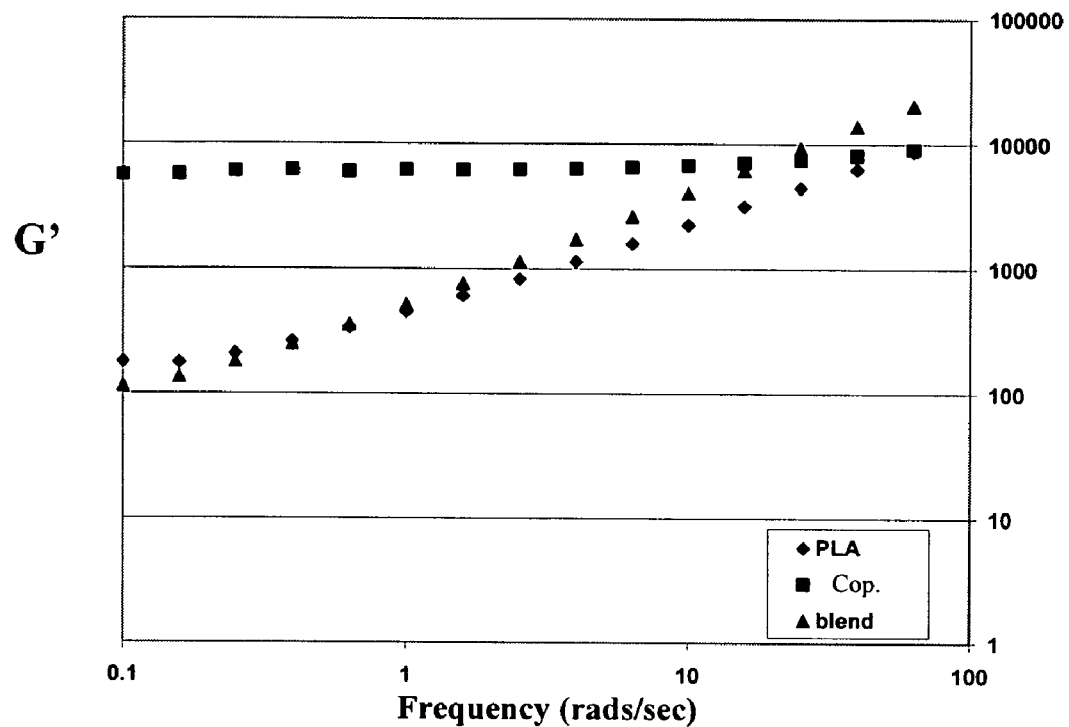
FIG. 11 illustrates the loss (G', FIG. 11A) and storage moduli (G", FIG. 11B) at 165° C. vs. frequency for PLA, 20 wt % PHA-co-PLA from melt, and 20 wt % PHA/PLA blend.
Figure 11B:
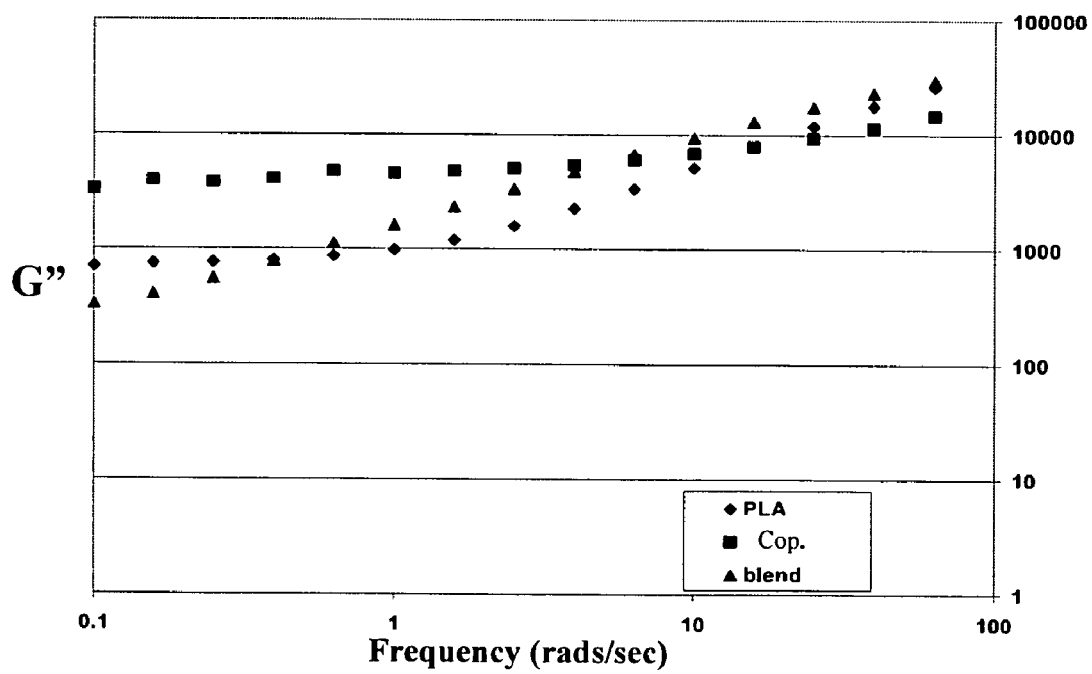

Dynamic Mechanical characterization was performed on PHA, PLA and the in situ copolymer to determine its applicability in applications that require rigorous processing conditions. Samples were first subjected to a strain sweep test in which they were deformed at different strain rates and the moduli recorded to determine the linear viscoelastic region (not shown). The samples were then subjected to a frequency sweep varying the range of frequencies at 165° C. In FIG. 9, the tensile modulus of the PHA homopolymers, the PLLA homopolymers, copolymers formed from melt (M.cp) and from solution (S.cp), as well as the 20 wt. % PHA/PLLA blend are compared. FIGS. 10 and 11 show the storage and loss moduli and complex viscosity of PLLA and the in situ PHA-co-PLA copolymer. The loss modulus is always higher then the storage modulus for all the polymers which indicates that the viscous response is stronger than the elastic response where energy stored during deformation is greater than the loss of energy due to changes in the frequency. An increase in the frequency for the copolymer shows less change in the storage and loss moduli, whereas the storage and loss moduli of both PLA and PHA (not shown) varies more over the range of frequencies. The complex viscosity of PLA and the copolymer is also shown and the viscosity is reduced compared to the homopolymer of PLA.

Example 2

Long chain primary alcohols (oE-OH) were obtained from the Baker Petrolite Company of Sugar Land, Tex. under the trade name of Unilin®. Each alcohol was polymerized with lactide monomer according to a reaction scheme as discussed above.

A typical polymerization was carried out in 5-mL ampoules, which were flame-dried and purged with argon. oE-OH (0.1 g), L-LA (1 g, 6.9 mmol), and $Sn(Oct)_2$ (100 μL of a 0.01 mol $L^{-1}$ solution in anhydrous toluene) were transferred into the ampoule. After the evaporation of the solvents with three freeze-thaw cycles under argon, the tube was sealed in vacuo and heated to 130° C. in an oil bath. After 24 hours, the crude product was dissolved in chloroform and precipitated into methanol. The resulting polymer was dried in vacuo for 24 hours at 40° C. The polymerization was carried out using four different oE-OH materials having different average molecular weights: 1oE-OH—350 (Unilin® 350), 2oE-OH—425 (Unilin® 425), 3oE-OH—550 (Unilin® 550), 4oE-OH—700 (Unilin® 700).

$^1$H NMR (500 MHz) and proton-decoupled $^{13}$C NMR (125 MHz) spectra were obtained with a JOEL Eclipse$^+$® 500 spectrometer system. Chloroform-d was used as the solvent, and the reported chemical shifts were internally referenced to tetramethylsilane (0 ppm) and $CDCl_3$ (77 ppm) for $^1$H and $^{13}$C nuclei, respectively. Infrared analyses were performed on thin films with a ThermoNicolet Magna®-IR 550 Fourier transform infrared (FTIR) spectrometer equipped with a Nic-Plan FTIR microscope. Gel permeation chromatography (GPO) data were collected in tetrahydrofuran with a Waters 2690 Alliance® system with refractive-index detection at 35° C. and with two consecutive Polymer Labs PLgel® 5-mm Mixed-D and Mixed-E columns. The retention times were calibrated against Polymer Labs Easical® PS-2 polystyrene standards. For the matrix-assisted laser desorption/ionization time-of-flight mass spectrometry (MALDI-TOF MS) analysis, an Omniflex® MALDI-TOF MS instrument from Bruker Daltonics was used. The matrix for all measurements was 2,5-dihydroxybenzoic acid. The concentration ratio of the matrix to the sample was about 50:1 (wt. %), and as a cationization agent, lithium sulfate was added (ca. 10 wt. %). The components were mixed in a mortar without a solvent. DSC data were obtained with a TA Q1000® DSC system at a heating rate of 10° C. $min^{-1}$ in a nitrogen atmosphere. The glass-transition temperatures ($T_g$'s) were obtained from second heating after cooling at 10° C. $min^{-1}$. The reported $T_g$ values were taken at the inflection point of the heat flow curve.

The melt polymerization process yielded oE-co-PLAs with a number-average molecular weight ($M_n$) range of 34-53×10$^3$, as shown below in Table 2. Tin alkoxide initiators are known to cause intramolecular and intermolecular transesterification reactions during the ring-opening polymerization of lactide above the polymerization temperature of 100° C. The polymers exhibited a polydispersity of approximately 1.7, which indicated some transesterification (Table 2). Oligomers of -co-PLA suitable for MALDI-TOF MS analysis were also synthesized with the same procedure and a higher ratio of oE-OHs.

The molecular weights of the copolymers were determined by GPC (vs. polystyrene) and are summarized in Table 2.

TABLE 2

| Polymer | oE-OH feed w % | Exp. m:n$^a$ | $M_n^b$ (×10$^{-3}$) | $M_w/M_n^b$ |
|---|---|---|---|---|
| 1oE-co-PLA | 10 | 10.8 | 37 | 1.7 |
| 2oE-co-PLA | 10 | 5.8 | 45 | 1.7 |
| 3oE-co-PLA | 10 | 8.5 | 34 | 1.7 |
| 4oE-co-PLA | 10 | 13.4 | 40 | 1.8 |
| PLLA | 0 | — | 53 | 1.2 |

Figure 12:
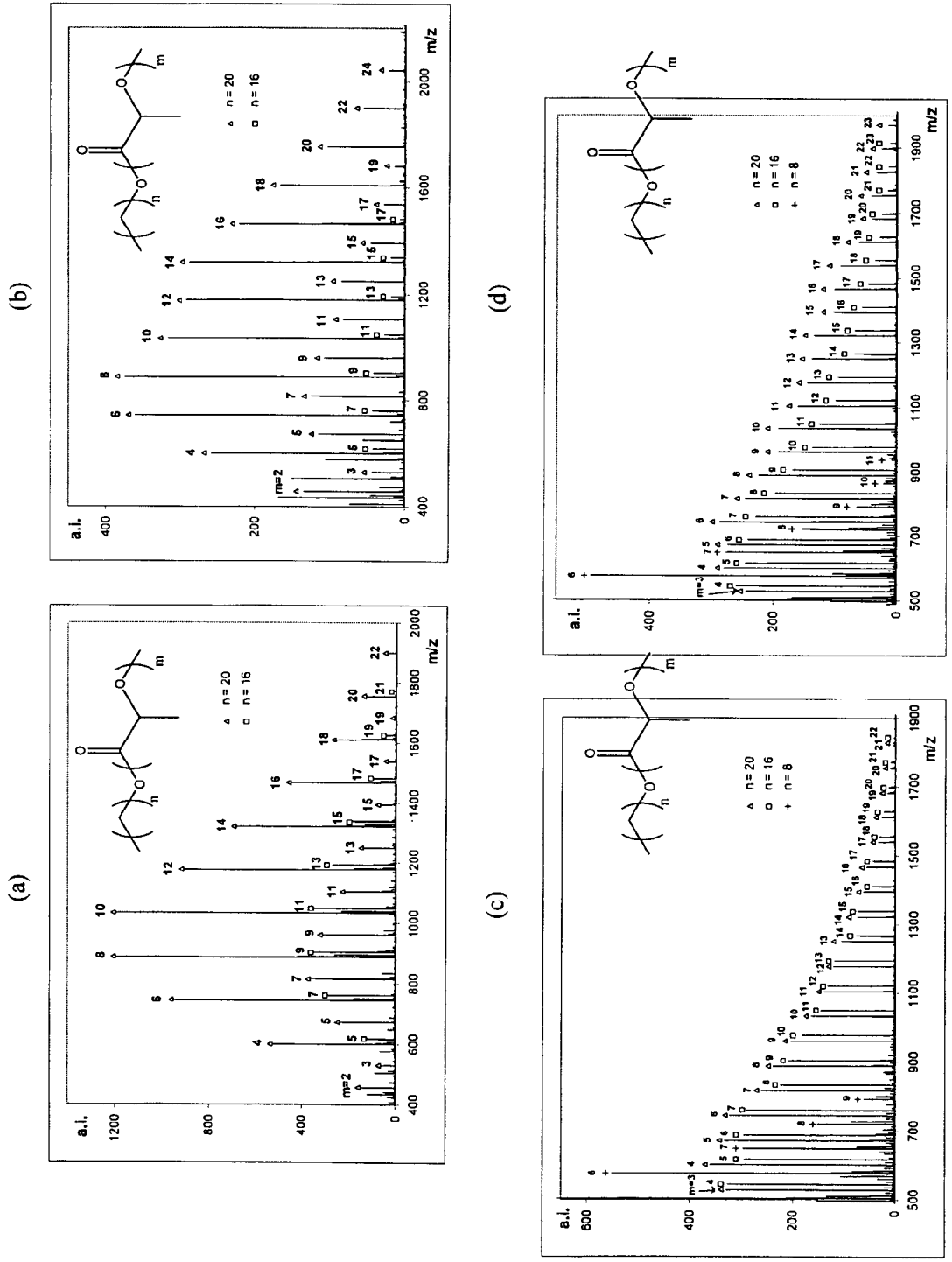
FIGS. 12(*a*)-12(*d*) illustrate MALDI-TOF MS spectra of four different oligoethylene-end-capped polyester (oE-co-PLA) copolymers formed as described in Example 2.

$^a$The ratio of the degree of polymerization of the PLA block (m) to that for the oligoethylene block (n) was determined by NMR.
$^b$Determined by GPC in chloroform versus polystyrene The MALDI spectra for the different oE-co-PLA copolymers are shown in FIG. 12. In the spectrum for oligomer 1oE-co-PLA [FIG. 12(a)], two distinct mass series can be detected. The highest masses reached m/z=2000. Relative molecular weights were also determined by GPC (ca. 2000 vs PS), and the results of both methods corresponded very well. Because of the low molecular weight of the copolymers, the composition could be calculated. oE-OHs with chain lengths of n=20 and n=16 were found, and the lactide chain lengths were measured in the range of m=2 to m=22. The most intense signals in the MALDI spectrum arise from even-membered PLLA oligomers, as expected. Further analysis of the spectrum indicated odd-membered oligomers for both oligomer series with n=20 and n=16.

In the MALDI-TOF mass spectrum of 2oE-co-PLA [FIG. 12(b)], the same oligomer series with n=16 or 20 and m=2-20 can be observed. A comparison of the mass spectra of FIG. 12(a) and FIG. 12(b) revealed only a difference in the signal intensity of the n=16 series, which slightly decreased with 3oE-OH. The MALDI spectrum for the low-molecular-weight copolymer 3oE-co-PLA [FIG. 12(c)] reveals three different mass series. Again, signals for copolymers with oE chain lengths of 20 and 16 can be found. The analysis of these series indicated that both even- and odd-membered oligomers were present in comparable abundance. The signals of the third series were assigned to an oE chain length of n=8 and lactyl repeat units up to m=9. The mass spectrum of the copolymer initiated by Unilin® 700 (4oE-co-PLA) in FIG. 12(d) shows oligomer series similar to those of the spectrum of 3oE-co-PLA [FIG. 12(c)]. However, in the case of 4oE-co-PLA, the oligomer series n=20 appears more abundant than the n=16 series in comparison with the mass spectrum of 3oE-co-PLA, in which these two series show comparable abundance.

Figure 13:
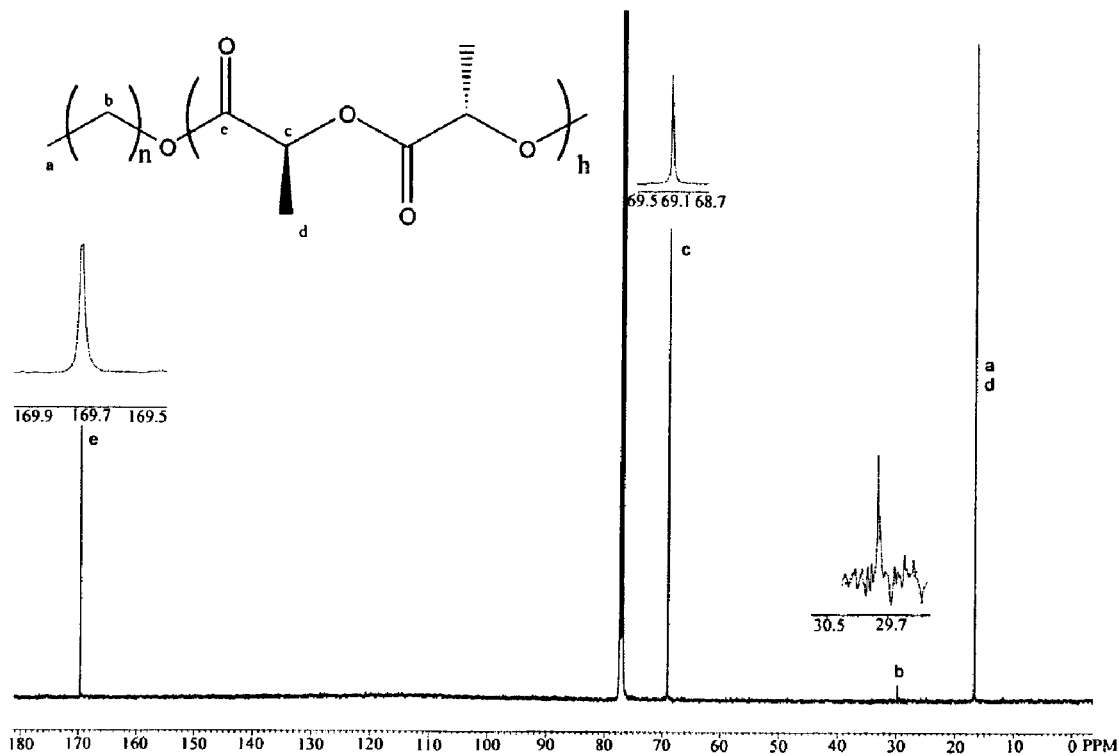
FIGS. 13(A) and 13(B) are the $^{13}$C and $^{1}$H NMR spectra, respectively, of an exemplary oE-co-PLA copolymer.
Figure 13:
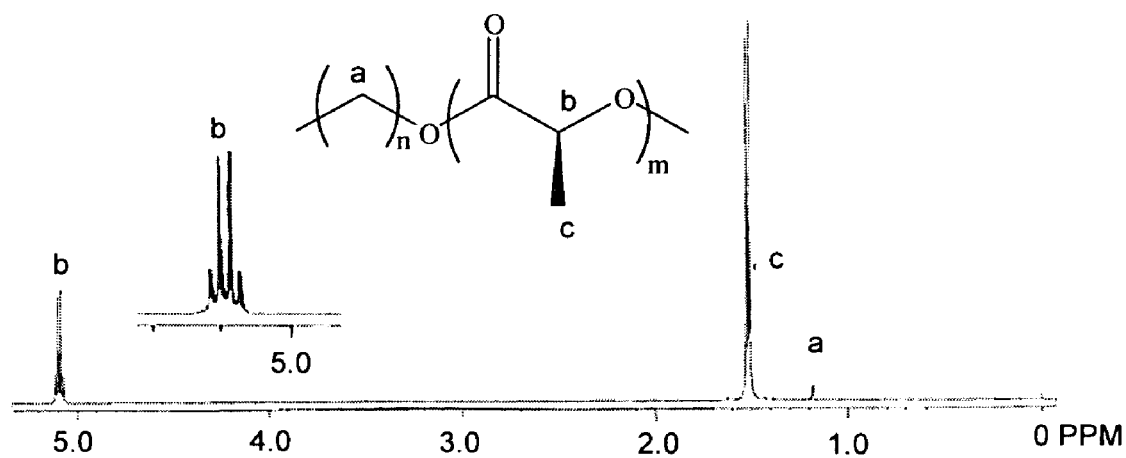

The $^1$H and $^{13}$C NMR spectra of copolymer 4oE-co-PLA are shown in FIGS. 13A and 13B, respectively. In the $^1$H NMR spectrum, the presence of signals at δ values of 1.5 and 5.1 ppm represent the methyl and methylene proton resonance of the lactide moiety, respectively. Methyl proton signals of oE moieties were too weak to be observed, whereas the lactide methyl proton appeared at δ=1.5 ppm and the methylene proton signals of oE appeared at δ=1.2 ppm. The ratio of the degree of polymerization for the PLA block (m) to that for the oE block (n) of the oE-co-PLAs is reported in Table 2. This was calculated with the peak integration ratio of the methylene lactyl units (m) with the methylene (2n) of oE moieties in the copolymer $^1$H NMR spectrum. As shown in Table 2, the oE-co-PLAs exhibited an m/n molar ratio range of 4-14.

The stereo sequence distribution of the copolymer strongly affects the $^{13}$C and $^1$H NMR spectra and allows an investigation of the polymer microstructure. The stereochemistry-structure-property relationship of PLAs, including the crystallization kinetics and degradation properties, has been extensively investigated with high-resolution NMR spectroscopy and found to be directly related. FIG. 13(a) displays the $^{13}$C NMR spectrum of copolymer 4oE-co-PLA with selected expanded signals shown as insets. The signals observed at 169.7, 69.1, and 16 ppm were assigned to the carbonyl, methylene, and methyl carbons of lactide moieties, respectively, whereas the signal at 29.7 ppm represents the of methylene carbons.

Specific results for the copolymer formed from the Unilin®550 (oE3-co-PLA) were as follows: Yield: 92%. FTIR (neat film, cm$^{-1}$): 695, 755, 871, 921, 956, 1182, 1293, 1304, 1359, 1456 (oE $C_nH_{2n}$), 1747 (C=O), 2849, 2918, 2945, 2996, 3507 (—OH). $^1$H NMR (500 MHz, CDCl$_3$, δ, ppm): 5.1 (q, 8.52H, α.-H LA), 1.6 (d, 29.5H, CH$_3$), 1.2 (s, 1H, CH$_2$ oE-OH). $^{13}$C NMR (125 MHz, CDCl$_3$, δ, ppm): 169.7, 69.1, 29.8, 16.7.

Figure 14:
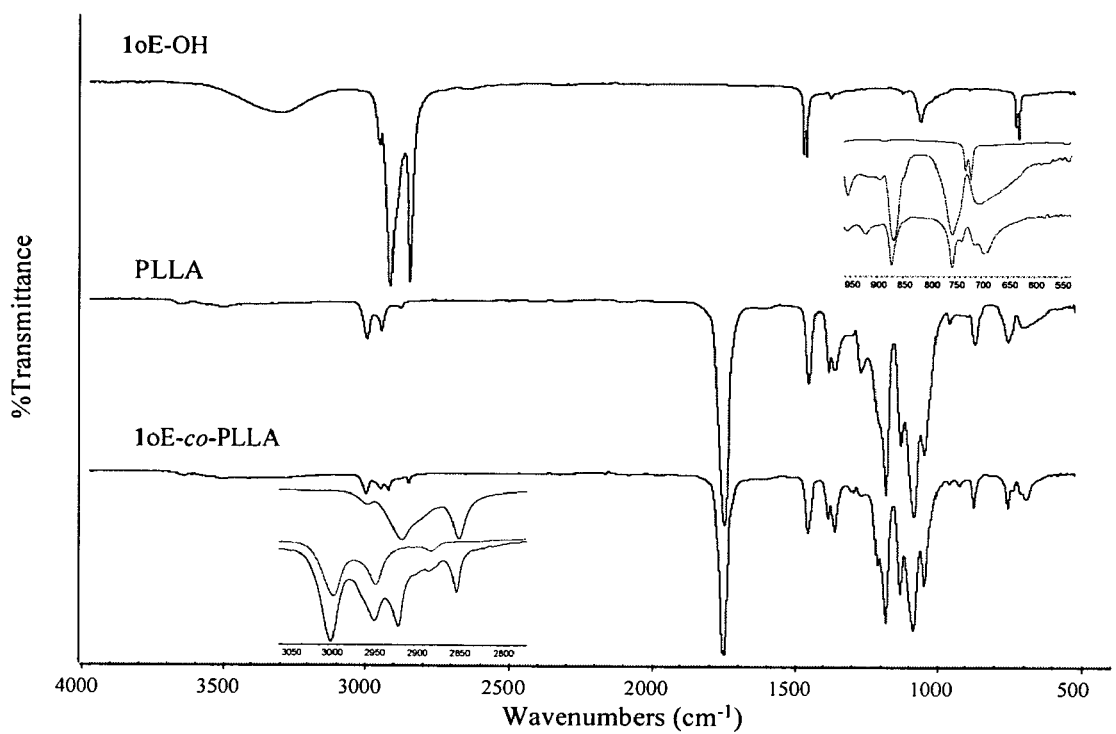
FIG. 14 illustrates the FTIR spectra of Unilin®350, PLLA, and an oE-co-PLA copolymer.

FTIR film spectra of 1oE-OH, linear PLLA, and copolymer 1oE-co-PLA are shown in FIG. 14. The characteristic broad peak (3300 cm$^{-1}$) for hydroxyl groups of the oE-OH disappeared upon copolymerization, and a relatively narrow peak appeared around 3500 cm$^{-1}$, possibly due to the —O—H-terminated copolymer. The characteristic C—H stretching and bending bands of oEs appear at 2917, 2849, 1472, 1463, 729, and 719 cm$^{-1}$. For the oE-co-PLA copolymer, oligoethylene C—H stretching bands are clearly distinguishable from the lactide C—H stretching bands, which appear at 2946 and 2996 cm$^{-1}$.

Figure 15:
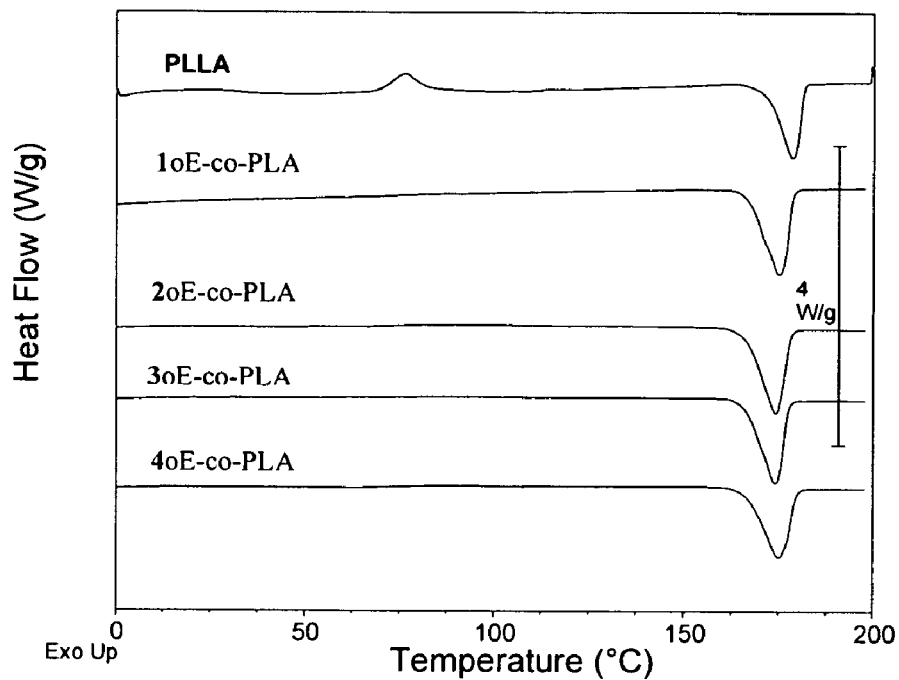
FIG. 15 illustrates the first (FIG. 15(A)) and second (FIG. 15(B)) heating DSC thermograms for two oE-co-PLA copolymers.
Figure 15:
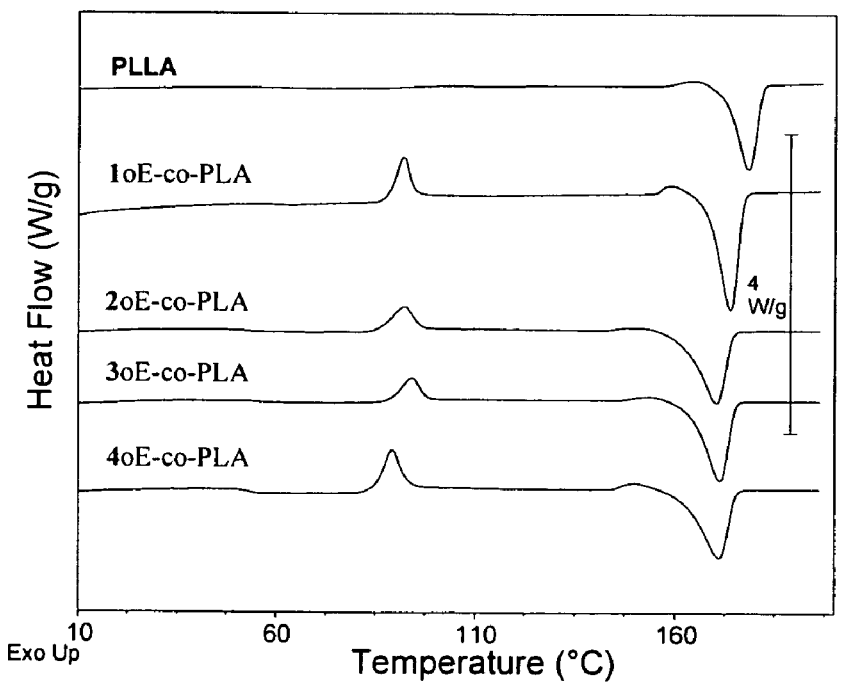

The thermal properties of the oE-co-PLA copolymers were also examined by DSC. FIG. 15(A) shows the first heating curves for linear PLLA and all four copolymers obtained at a heating rate of 10° C. min$^{-1}$. Table 3 summarizes the thermal data for PLLA and the copolymers. PLLA exhibits a sharp endotherm melting at 178° C., and the copolymer melting transitions were observed around 174° C. Cold crystallization during the first heating occurred between 76 and 87° C. for the copolymers and PLLA. The $T_g$'s observed for the polymers varied from 52 to 60° C.

TABLE 4

| Polymer | % Crystallinity$^a$ | % Crystallinity$^b$ |
|---------|---------------------|---------------------|
| 1oE-co-PLA | 54 | 64 |
| 2oE-co-PLA | 53 | 54 |
| 3oE-co-PLA | 51 | 53 |
| 4oE-co-PLA | 50 | 56 |
| PLLA | 42 | 48 |

Figure 16:
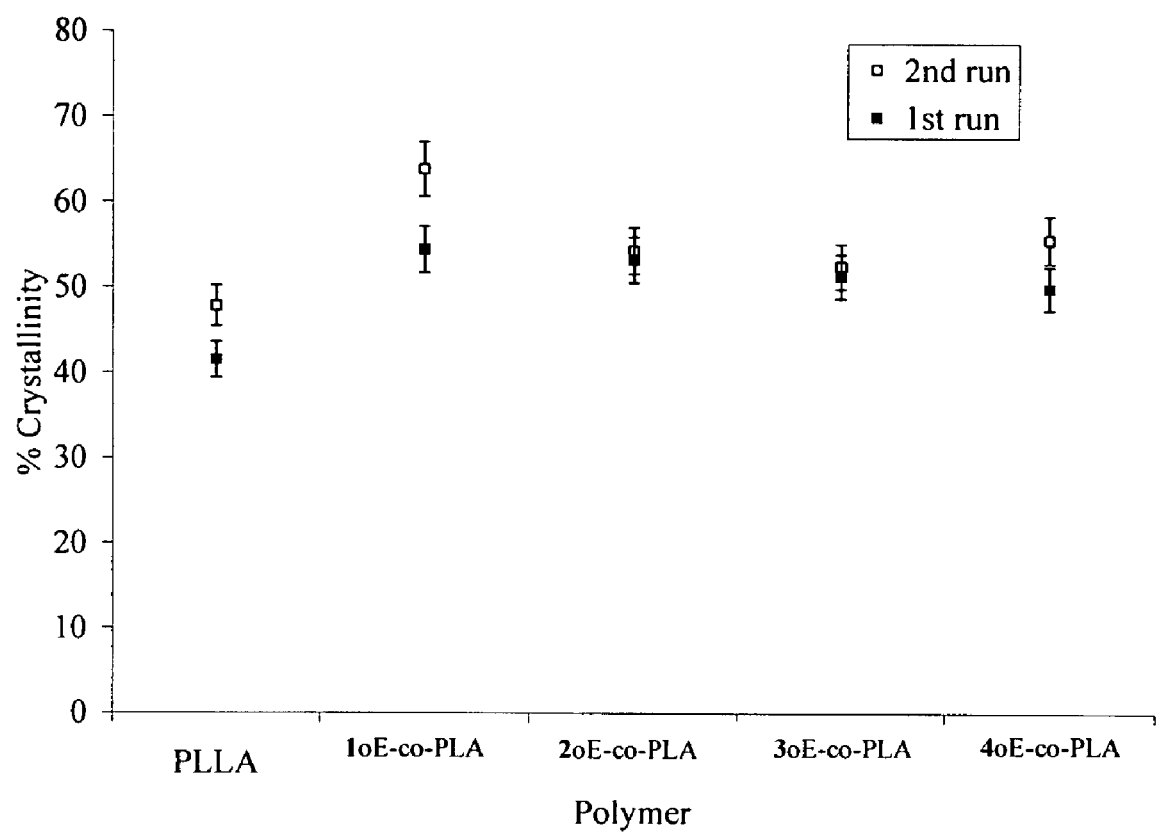
FIG. 16 graphically presents the crystallinity for PLLA and copolymers formed in Example 2 as calculated with both the first and second DSC scan melting temperatures.

$^a$Deduced from the first DSC thermograms
$^b$Deduced from the second DSC thermograms The degree of crystallinity in the copolymers was calculated with the following equation:

$$\text{Crystallinity}(\%) = (\Delta H_f/\Delta H_f^\circ) \times 100$$

where $\Delta H_f$ is the observed melting enthalpy and $\Delta H_f^\circ$ is 93 J/g for the heat of fusion for 100% crystalline PLA. The crystallinity data deduced from the first and second heating scans of DSC are presented in FIG. 16.

As somewhat expected, the copolymers were found to be more crystalline than homo-PLLA. Copolymer 1oE-co-PLA contained the smallest alkyl chain length among the four oE-OHs used and exhibited the highest crystallinity. This is consistent with the expected micellular mechanism and general nucleation phenomena, by which smaller nucleation sites afford larger crystallites.

Figure 17:
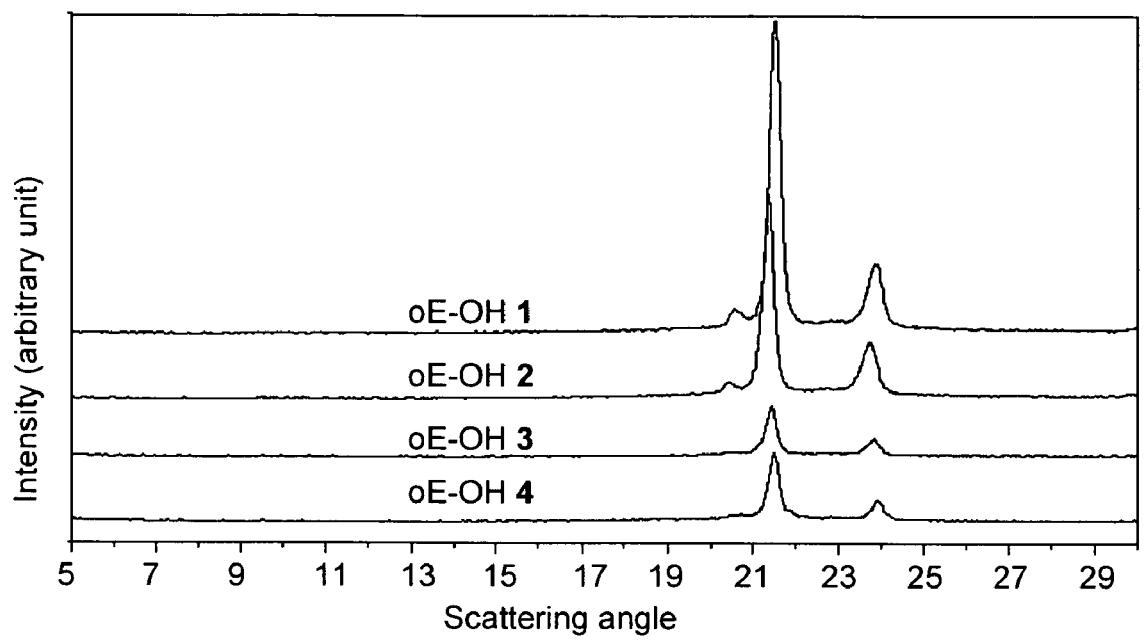
FIG. 17 illustrates the X-ray diffraction plot obtained for each of the long-chain alcohol starting materials copolymerized with lactide in Example 2.

X-ray diffraction patterns for the four different oE-OHs used in this study are shown in FIG. 17. All oligethylene samples exhibited crystalline peaks around 2θ angles of 20.6, 21.5, and 23.8°. Only the relative intensity of the crystalline peaks changed with the type of —OH used.

Wide-angle X-ray diffraction measurements were also performed to investigate the crystallization of oE-co-PLAs and PLLA with thin films that were isothermally crystallized at temperatures between 120 and 140° C. For the films isothermally crystallized at 140° C., homo-PLLA exhibited sharp diffraction peaks at 2θ angles 14.8, 16.8, 19.4, and 22.5°, assigned to 010, 200, 203, and 015 reflections, respectively, and characteristic of the x-crystal cell of PLLA, with the

TABLE 3

| Polymer | $T_m$ (° C.) 1$^{st}$ heat | $T_m$ (° C,) 2$^{nd}$ heat | $\Delta H_m$ (J/g) 1$^{st}$ heat | $\Delta H_m$ (J/g) 2$^{nd}$ heat | $T_c$ (° C.) 1$^{st}$ heat | $T_c$ (° C.) 2$^{nd}$ heat | $\Delta H_c$ (J/g) 1$^{st}$ heat | $\Delta H_c$ (J/g) 2$^{nd}$ run | $T_g$ (° C.) 2$^{nd}$ run |
|---|---|---|---|---|---|---|---|---|---|
| 1oE-co-PLA | 175 | 174 | 51 | 59 | 82 | 92 | 1.2 | 17 | 60 |
| 2oE-co-PLA | 174 | 170 | 50 | 51 | 84 | 92 | 2.7 | 13 | 52 |
| 3oE-co-PLA | 174 | 171 | 48 | 49 | 87 | 94 | 2.8 | 11 | 54 |
| 4oE-co-PLA | 175 | 171 | 46 | 52 | 84 | 89 | 2.4 | 23 | 54 |
| PLLA | 179 | 178 | 39 | 44 | 76 | 104 | 14.6 | 2 | 60 |

Figure 18:
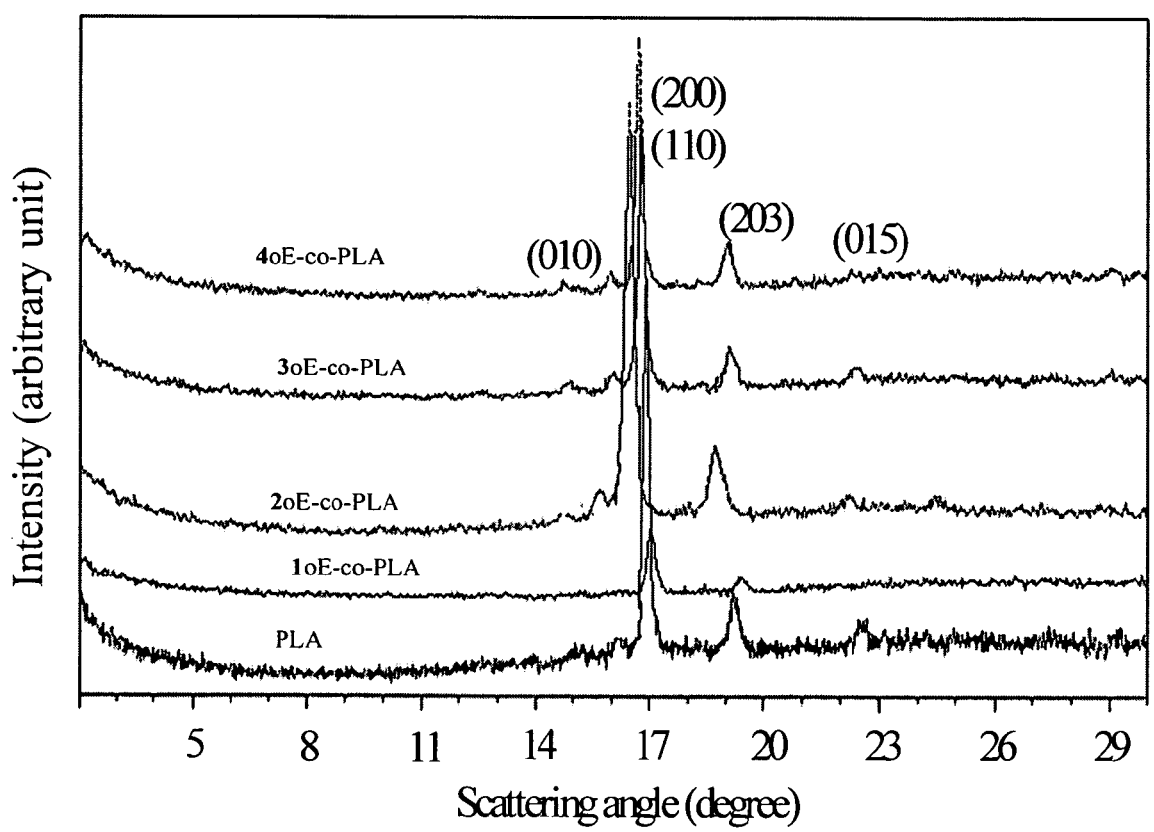
FIG. 18 is the X-ray diffraction plot for PLLA homopolymer and several oE-co-PLA copolymers.

A second DSC thermogram was recorded at the same heating rate after cooling at 5° C. min$^{-1}$ for all the polymers, as shown in FIG. 15(B). These graphs clearly show the cold-crystallization exotherm below 90° C. and the melting endotherm around 170° C.; for homo-PLLA, cold crystallization occurs around 103° C. (Table 4). All the copolymers exhibit a much more intense cold-crystallization peak than that observed for linear PLLA.

orthorhombic cell (α=1.060 nm, b=0.605 nm, c=2.880 nm), as shown in FIG. 18. Similar patterns of X-ray diffractograms have been recorded for PLAs.

The diffraction peaks of the block copolymers appeared at 2θ angles of 16.2, 16.8, 19.4 and 22.5°, which were assigned to the x form of PLLA. However, no peaks were observed corresponding to the crystallized oligoethylene phases. These results suggest that only PLLA segments exist in very high crystallinity and the crystallization of oligoethylene blocks is not occurring above the detection limit.

Example 3

Poly(ester amide)s (polyEA) were derived from lactide and one of two different cyclic depsipeptides according to the following reaction scheme:

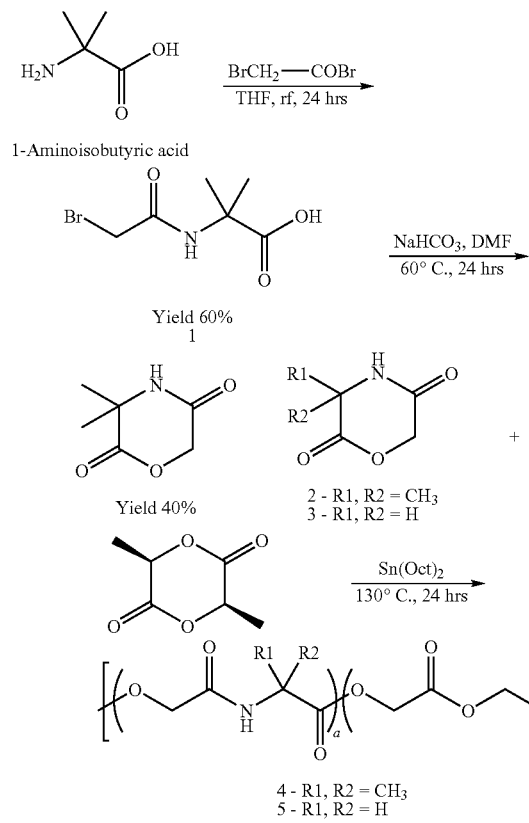

The depsipeptides utilized were either a commercial depsipeptide-2,5-morpholinedione (depsipeptide-3) or a formed 6,6'-dimethyl-2,5-morpholinedione (depsipeptide-2).

Depsipeptide monomer 3 was purchased from SPECS and BioSPECS B.V. Netherlands and was stored under nitrogen prior to use. L-Lactide was generously provided by Poly-Med, Inc. (Pendleton, S.C.), and Ortec Inc. (Easley, S.C.) and was recrystallized from ethyl acetate and vacuum dried prior to use. All reactions were carried out in an inert atmosphere. Solvents were dried using standard procedures. Other chemicals and reagents were purchased from Aldrich or Fisher Scientific and used as received unless otherwise stated.

N-(bromoacetyl)-2-aminobutyric acid (1). A solution of bromoacetyl bromide (50 g, 24 mmol 1 molar eq.) in dry THF (500 ml) was slowly added to a 2 L round-bottomed three-neck flask with a mechanical stirrer, a nitrogen gas purge and an addition funnel containing 2-aminobutyric acid (25 g, 24 mmol) in 500 mL dry THF. After stirring at room temperature for 12 hours the reaction mixture was filtered and the THF evaporated from the filtrate gave yellow oil, which crystallized upon cooling in 60% yield. $^1$H NMR (500 MHz, DMSO d6) δ (ppm): 8.30 (s, 1H), 3.8 (s, 2H), 1.5 (s, 6H). $^{13}$C NMR (500 MHz, DMSO d6) δ (ppm): 178, 177, 57, 29, 25. MS (m/z) (%) 224 (30), 208 (20), 178 (99), 121 (40), 88 (65), 58 (100).

6,6' dimethyl 2,5-Morpholinedione (2). NaHCO$_3$ in 250 ml DMF was introduced to a 1 L round-bottomed three-neck flask with a mechanical stirrer, a nitrogen gas purge and an addition funnel. To this vigorously stirred solution, N-(bromoacetyl)-2-aminobutyric acid (25 g, 11 mmol) in dry DMF 500 ml was added dropwise at 60° C. over a period of 8 hours and was heated at 60° C. for another 24 hours. After removal of DMF, the residue was stirred with 500 mL of hexane and CHCl3 respectively for an hour and filtered. The filtrate was evaporated to give colorless crystals in 40% yield. $^1$H NMR (500 MHz, DMSO d6) δ (ppm): 8.67 (s, 1H), 4.84 (s, 2H), 1.40 (s, 6H). $^{13}$C NMR (500 MHz, DMSO d6) δ (ppm): 173, 170.6, 73, 55.5, 23.4. MS (m/z) (%) 144 (20), 128 (25), 99 (100), 71 (100), 58 (70).

Copolymerization of 2 with L-LA (Poly(LA-co-2). A general procedure for copolymerization follows the example described below. 6,6'-dimethyl 2,5-morpholinedione 2 (0.2 g, 1.4 mmol), L-LA (0.8 g, 5.6 mmol) and Sn(Oct)$_2$ (70 μL of 0.01 mol L-1 solution in anhydrous toluene) were transferred to a 5 ml ampoule. After evaporation of the solvents, the tube was sealed in vacuum (1×10-4 Torr) and heated to 130° C. in an oil bath. After 24 hours the crude product was dissolved in chloroform and precipitated into methanol. The resulting polymer was dried in vacuo giving a fibrous white powder (0.85 g) in 85% yield. $^1$H NMR (500 MHz, CDCl3) δ (ppm): 6.60 (s, NH), 5.1 (m, L-LA-CH), 4.56 (s, CH2), 1.6 (d, CH3). $^{13}$C NMR (500 MHz, CDCl3) δ (ppm): 172, 169, 72, 69, 57, 25, 16.

Copolymerization of 3 with L-LA (Poly(LA-co-3). Copolymerization of L-lactide and depsipeptide 3 was performed similarly as described above to give a white powder in 93% yield. $^1$H NMR (500 MHz CDCl3) δ (ppm): 6.8 (s, NH), 5.1 (m, L-LA-CH), 4.5-4.6 (d, CH2), 1.5 (s, CH3). $^{13}$C NMR (500 MHz, CDCl3) δ (ppm): 171, 169, 69.5, 69, 41, 16.

Electrospinning. 10% (w/w) PLA and PLA-co-depsipeptide solutions in chloroform were prepared under constant stirring at room temperature. For electrospinning, each polymer was placed in a plastic syringe (BD, 10 ml) with a stainless steel electrode (22 G) and connected to a power supply. A grounded counter-electrode was connected to an aluminum collector. The specified voltage was 12500V and the distance between the needle and collectors was 10 cm. The flow rate was set at 4 ml/hr, and 2 ml of each polymer solution was used during electrospinning. The resulting PLA and PLA-co-depsipeptide meshes were dried under vacuum for 2 days and stored.

Figure 19:
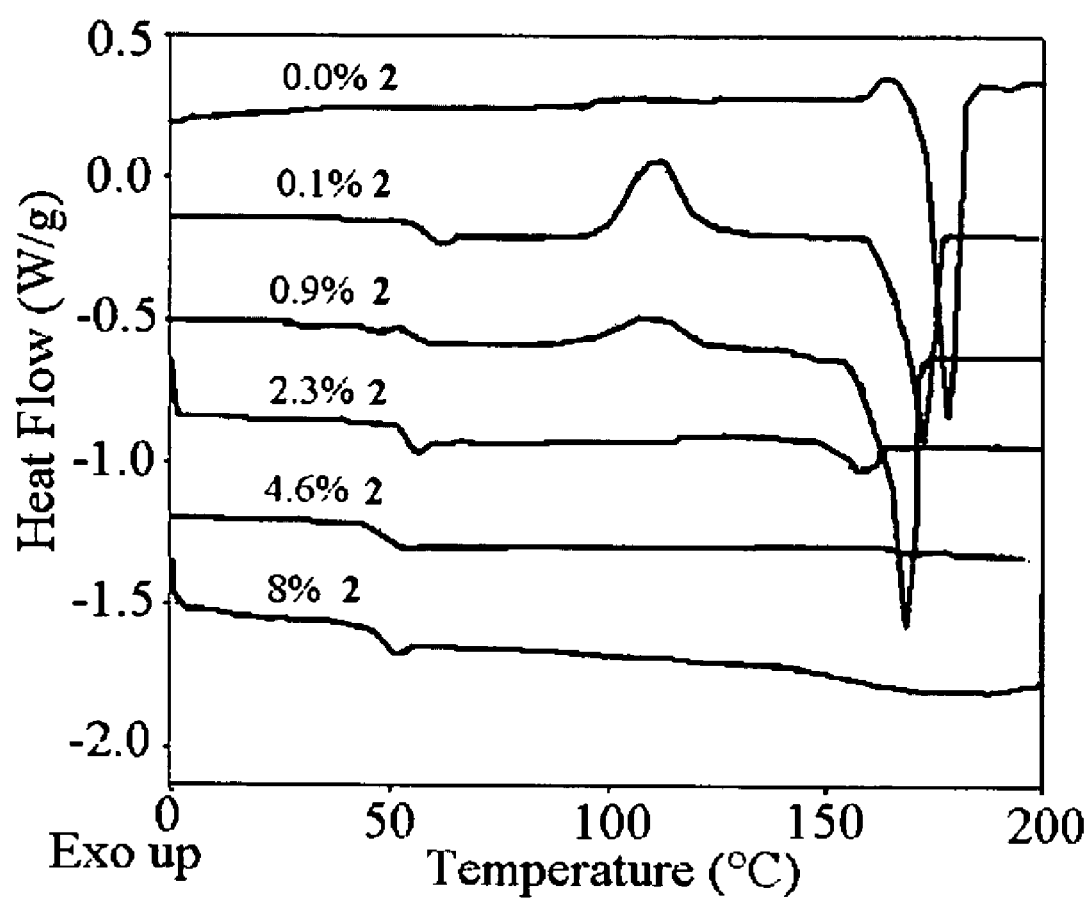
FIG. 19 graphically illustrates the second DSC heating scans of polyester amides derived from lactides copolymerized with a depsipeptide.

First and second DSC heating scans of the poly(LA-co-2) with variable monomer composition (0, 0.1, 0.9, 2.3, 6, 8, and 14 mol % of 2) were obtained. The second DSC heating scans of all but the 14 mol % composition are illustrated in FIG. 19. Increasing the percentage of 2 resulted in the decline in recrystallization peak intensity. With 6% of 2, the DSC scan exhibited two melting peaks which may be due to the increasing imperfection of crystals in the copolymer. The copolymers containing 14% 2 exhibited a $T_g$ of 40° C. which was reproduced in the second and third heating cycle at 10° C. ramp per minute. After quenching the samples at 5° C. min$^{-1}$, a second heating scan was obtained with a 10° C. min$^{-1}$ heating rate. As shown in FIG. 19, under the given conditions in the second DSC scan, with higher percentage of 2 the crystalline melting temperature decreased dramatically and the copolymer became completely amorphous. Barrera and colleagues reported that in poly(L-lactic acid-co-lysine), both the Tg and Tm decreased dramatically as the lysine monomer content was increased. They observed that the degradation rate of the copolymers was much faster than the neat PLLA due to the disruption of crystallinity by the lysine residues.

Figure 20A:
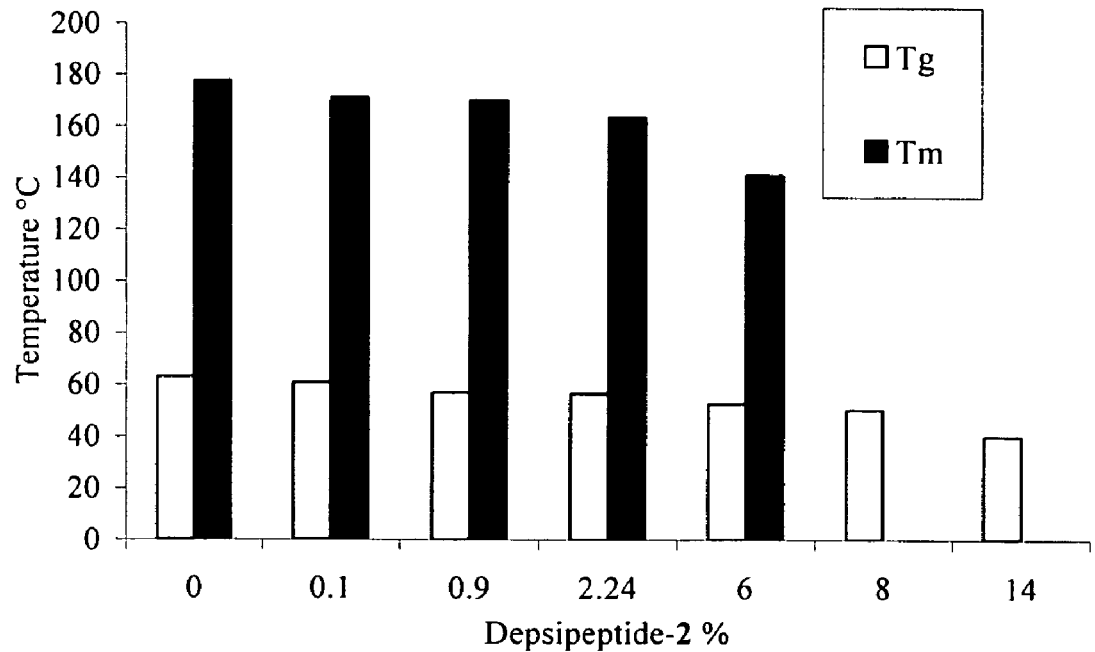
FIGS. 20A and 20B are graphical representations of the change in crystalline melting temperature and glass transition temperature determined by DSC of polyester amides derived from lactides copolymerized with depsipeptides.

FIG. 20A is a graphical representation of the change in crystalline melting temperature(Tm) and glass transition temperature (Tg) determined by DSC for poly(LA-co-2) and poly(LA-co-3) for selected monomer contents. The highest 2 substituted material had a $T_g$ of 40° C. whereas the unsubstantiated PLA had a $T_g$ of 63° C. The melting temperature for the copolymers decreased with increasing 2, and when the composition was higher than 8% 2, the copolymer became amorphous. Poly(L-LA) exhibited a $T_m$ of 177° C. and a $T_g$ of 63° C. The $T_m$ for the copolymers was lower than that of the poly(LA) and exhibited a shoulder peak unlike the linear PLLA. Cold crystallization during the first and second heating cycles was observed for the copolymers with less than 2.3 depsipeptide 2 compositions. From these data, it was revealed that by incorporating a small percentage of defects into the main PLLA chain, the crystallization kinetics were dramatically changed.

Figure 20B:
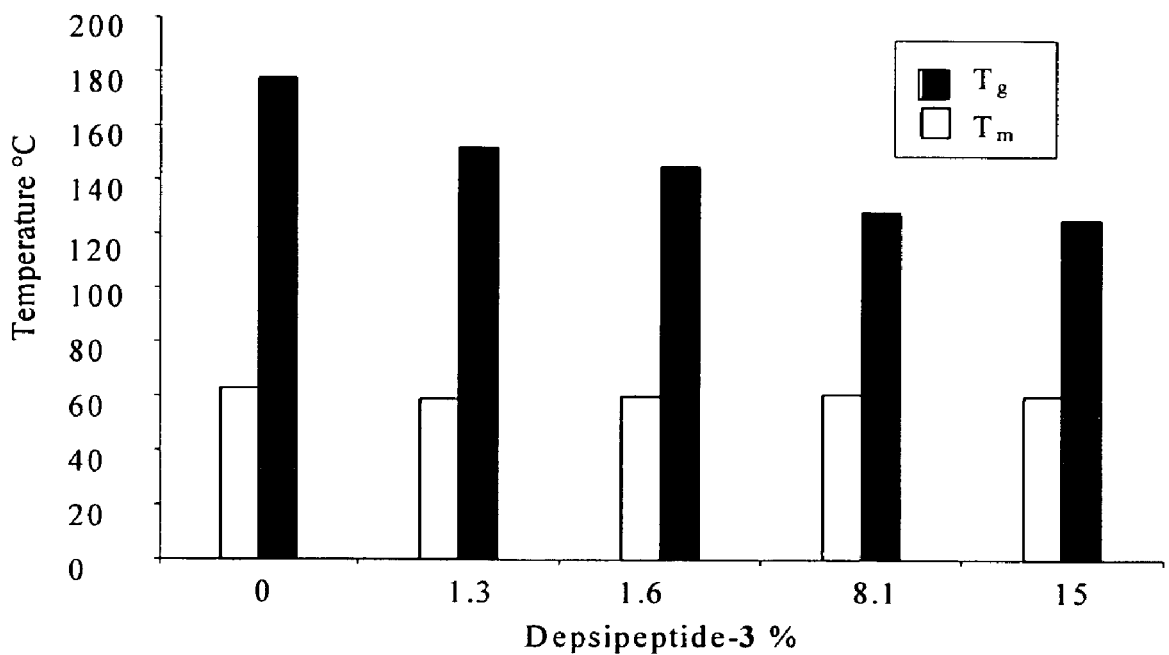

The thermal behavior of poly(LA-co-3) was also investigated by DSC. FIG. 20B shows an initial heat plot of crystalline melting temperature and glass transition temperature with variable compositions (1.3, 1.6, 8 and 16 mol % of 3) synthesized at 130° C. using $Sn(Oct)_2$. Interestingly, unlike Poly(LA-co-2)s, the glass transition temperature of the copolymers of 3 were around 60° C., irrespective of the copolymer composition. However, the melting temperature and the crystallinity of the copolymers were reduced significantly with the increase of the depsipeptide 3 content in the polymer backbone. With 15% of 3, the DSC scan exhibited two melting peaks, perhaps due to the increasing imperfection of crystals in the copolymer. The copolymer having 1.3-1.6% of 3 exhibited a cold crystallization around 100° C., and with the increase of the depsipeptide content it was suppressed. All the copolymers of LA and 3 exhibited shoulder peak at the melting curves, probably due to the imperfect crystallization of PLA. Although all the copolymers containing 0-16% of 3 moieties in the copolymer were initially crystalline, only the copolymers having 0-1.6% of 3 were able to recrystallize upon cooling.

Figure 21:
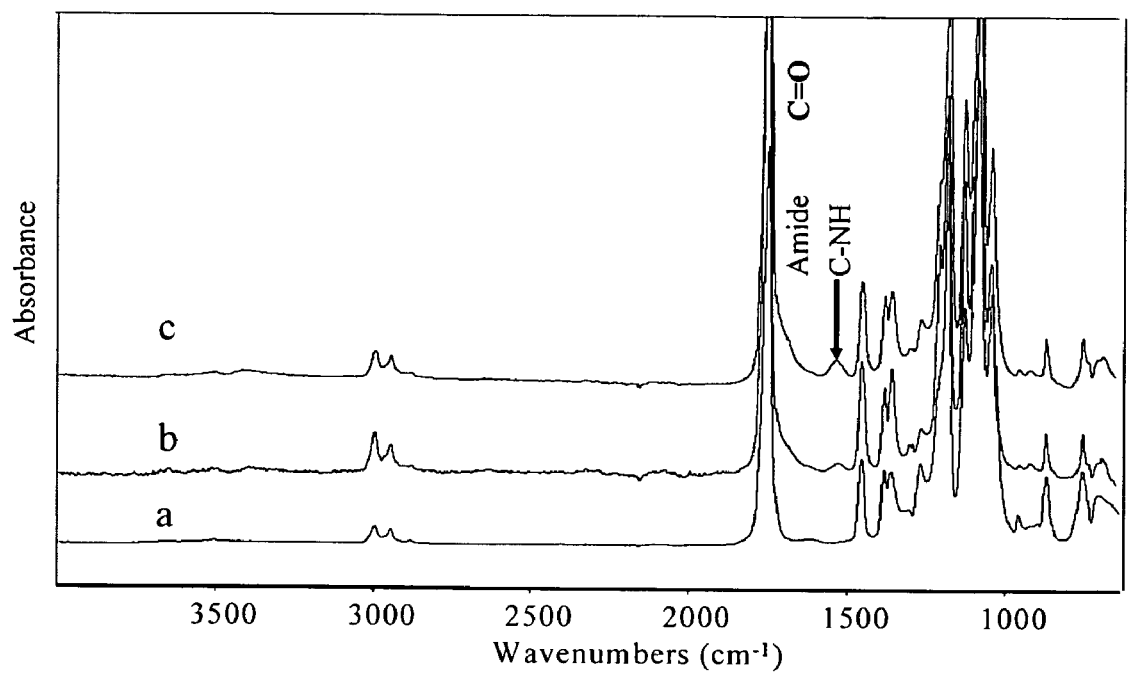
FIG. 21 is the FTIR analysis of lactic acid homopolymer (a) and two different polyester amides (b), (c) derived from lactides copolymerized with depsipeptides.

As shown in FIG. 21, FT-IR analysis of the LA homopolymer (a), poly(LA-co-2) (b) and poly(LA-co-3) (c) exhibited characteristic absorption bands of the different ester groups present. The carbonyl absorption for pure L-LA generally appears at 1759 $cm^{-1}$ as a narrow strong peak. Upon copolymerization with depsipeptide 2, the IR signal for the —C═O stretching became broader indicating the presence of an additional —C═O stretching absorbance rising from the depsipeptide moiety. In poly(LA-co-2) the characteristic amide absorption bands appear at 1685 $cm^{-1}$ and 1522 $cm^{-1}$. The peaks at 1181 and 1132 $cm^{-1}$ in the copolymers correspond to C-0 ester groups and the peaks at 2995 and 2945 $cm^{-1}$ correspond to —CH3 and —CH— groups of the lactide moieties. The C-0 ester groups from 2 appear at 1174 and 1208 $cm^{-1}$ and the —CH3 groups of 2 are clearly distinguishable at 1852 $cm^{-1}$. The wide band at 3400 $cm^{-1}$ was assigned to a characteristic —CONH— amide linkage. For poly(LA-co-3), the characteristic amide absorption bands appear at 1698 $cm^{-1}$ and 1524 $cm^{-1}$ while the C—O ester groups appear at 1181 $cm^{-1}$.

It will be appreciated that the foregoing examples, given for purposes of illustration, are not to be construed as limiting the scope of this disclosure. Although only a few exemplary embodiments have been described in detail, those skilled in the art will readily appreciate that many modifications are possible in the exemplary embodiments without materially departing from the novel teachings and advantages. Accordingly, all such modifications are intended to be included within the scope that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A polymer formed by the ring-opening polymerization of lactide, the polymer comprising a lactide residue and a residue of a microorganism-produced polyhydroxyalkanoate homopolymer, the polyhydroxyalkanoate homopolymer having the following structure:

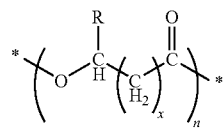

wherein
R is an alkyl group, a fluorine-containing moiety or an aromatic moiety,
n is >1, and
x is ≧1,
the polymer comprising the structure:

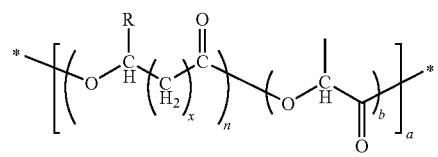

wherein
a≧1 and
b≧2,
the polymer having a glass transition temperature of greater than about 55° C. and a polydispersity of from 1.5 to 3.5.

2. The polymer of claim 1, the polymer further comprising an additional residue.

3. The polymer of claim 1, wherein the polymer is a linear thermoplastic polyester.

4. The polymer of claim 1, wherein the polymer is a thermoset network.

5. The polymer of claim 1, wherein the polymer is a component of a fiber.

6. The polymer of claim 1, wherein the polymer is a component of a film.

7. The polymer of claim 1, wherein the polymer is a component of a coating.

8. The polymer of claim 1, wherein the polymer is a nucleating agent.

9. The polymer of clam 1, wherein the lactide is racemic lactide.

10. The polymer of claim 1, wherein the polyhydroxyalkanoate homopolymer is poly(beta-hydroxybutyrate).

11. The polymer of claim 1, wherein the polymer is completely derived of renewable resources.

* * * * *